(12) United States Patent
Ahn et al.

(10) Patent No.: US 10,824,820 B2
(45) Date of Patent: Nov. 3, 2020

(54) LANGUAGE TRANSLATION DEVICE AND LANGUAGE TRANSLATION METHOD

(71) Applicant: Hyperconnect, Inc., Seoul (KR)

(72) Inventors: Sangil Ahn, Cheongju (KR); Kangsik Jung, Seoul (KR); Hyountaek Yong, Seoul (KR); Hyeok Choi, Seoul (KR)

(73) Assignee: Hyperconnect, Inc., Seoul (KR)

( * ) Notice: Subject to any disclaimer, the term of this patent is extended or adjusted under 35 U.S.C. 154(b) by 110 days.

(21) Appl. No.: 15/667,204

(22) Filed: Aug. 2, 2017

(65) Prior Publication Data

US 2018/0039623 A1    Feb. 8, 2018

(30) Foreign Application Priority Data

Aug. 2, 2016 (KR) .................. 10-2016-0098659

(51) Int. Cl.
| | | |
|---|---|---|
| G06F 40/58 | (2020.01) | |
| G06F 3/16  | (2006.01) | |
| G10L 15/22 | (2006.01) | |
| G10L 15/18 | (2013.01) | |
| G10L 15/26 | (2006.01) | |

(52) U.S. Cl.
CPC .............. G06F 40/58 (2020.01); G06F 3/167 (2013.01); G10L 15/1815 (2013.01); G10L 15/22 (2013.01); G10L 15/26 (2013.01)

(58) Field of Classification Search
CPC ............................... G06F 17/28; G06F 17/289
USPC ........................................................ 704/2, 9
See application file for complete search history.

(56) References Cited

U.S. PATENT DOCUMENTS

| | | | | |
|---|---|---|---|---|
| 5,349,368    A  * | 9/1994  | Takeda  | ................... | G06F 40/55 |
| | | | | 345/684 |
| 8,155,944    B2 * | 4/2012  | Kato    | ...................... | G06F 40/40 |
| | | | | 704/2 |
| 2002/0194300 A1* | 12/2002 | Lin     | ........................ | G06F 17/289 |
| | | | | 709/217 |
| 2003/0040899 A1* | 2/2003  | Ogilvie | ................. | G06F 17/289 |
| | | | | 704/2 |
| 2003/0065504 A1* | 4/2003  | Kraemer | ............... | G06F 17/289 |
| | | | | 704/8 |
| 2005/0261890 A1* | 11/2005 | Robinson | .............. | G06F 17/289 |
| | | | | 704/9 |
| 2006/0130006 A1* | 6/2006  | Chitale  | ................. | G06F 17/275 |
| | | | | 717/136 |
| 2007/0188596 A1* | 8/2007  | Kenoyer  | ........... | H04L 29/06027 |
| | | | | 348/14.08 |

(Continued)

FOREIGN PATENT DOCUMENTS

| | | |
|---|---|---|
| KR | 10-2001-0075552 A | 8/2001 |
| KR | 2011-0071205 A    | 6/2011 |
| KR | 2014-0105673 A    | 9/2014 |

OTHER PUBLICATIONS

Office Action dated May 23, 2017 of Korean Patent Application No. 10-2016-0098659 which is the parent application—7 pages.

*Primary Examiner* — Jakieda R Jackson
(74) *Attorney, Agent, or Firm* — Knobbe Martens Olson & Bear LLP

(57) ABSTRACT

A translation method may include: continuously receiving a voice recognition result for a first-language voice from a first terminal as a first-language text; continuously displaying the received voice recognition result; acquiring a second-language translation of an ended sentence included in the displayed voice recognition result; and substituting the displayed ended sentence with the acquired translation.

7 Claims, 25 Drawing Sheets

(56) References Cited

U.S. PATENT DOCUMENTS

| | | | | |
|---|---|---|---|---|
| 2008/0221862 A1* | 9/2008 | Guo | G06F 17/289 | 704/2 |
| 2009/0043563 A1* | 2/2009 | Bode | G06F 40/58 | 704/3 |
| 2009/0217196 A1* | 8/2009 | Neff | G06Q 10/10 | 715/799 |
| 2009/0265175 A1* | 10/2009 | Fang | G06F 17/289 | 704/277 |
| 2010/0030549 A1* | 2/2010 | Lee | G06F 1/1626 | 704/4 |
| 2010/0185434 A1* | 7/2010 | Burvall | G06F 17/289 | 704/3 |
| 2010/0198579 A1* | 8/2010 | Cunnington | G06F 17/289 | 704/3 |
| 2010/0204977 A1* | 8/2010 | Chiu | G06F 17/275 | 704/2 |
| 2010/0324886 A1* | 12/2010 | Tanaka | G06F 17/2827 | 704/7 |
| 2011/0046939 A1* | 2/2011 | Balasaygun | G06F 9/543 | 704/2 |
| 2011/0246172 A1* | 10/2011 | Liberman | G06F 17/289 | 704/2 |
| 2011/0279634 A1* | 11/2011 | Periyannan | H04N 7/141 | 348/14.09 |
| 2013/0143183 A1* | 6/2013 | Zilberman | G09B 5/06 | 434/157 |
| 2013/0238312 A1* | 9/2013 | Waibel | G10L 15/00 | 704/8 |
| 2013/0332144 A1* | 12/2013 | Chaturvedi | G06F 17/289 | 704/2 |
| 2014/0065997 A1* | 3/2014 | Walker | H04W 4/90 | 455/404.1 |
| 2014/0142917 A1* | 5/2014 | D'Penha | G06F 17/2836 | 704/2 |
| 2014/0222413 A1* | 8/2014 | Rossmann | G06F 40/58 | 704/3 |
| 2014/0324412 A1* | 10/2014 | Itamoto | G10L 15/00 | 704/3 |
| 2014/0358516 A1* | 12/2014 | Lin | G06F 17/289 | 704/2 |
| 2015/0051898 A1* | 2/2015 | Cuthbert | G06F 40/58 | 704/3 |
| 2015/0134322 A1* | 5/2015 | Cuthbert | G06F 17/289 | 704/3 |
| 2015/0195641 A1* | 7/2015 | Di Censo | H04R 1/1083 | 381/71.6 |
| 2015/0229591 A1* | 8/2015 | Vigliotti | H04L 51/046 | 709/206 |
| 2015/0350451 A1* | 12/2015 | Aue | H04M 3/568 | 379/202.01 |
| 2016/0162477 A1* | 6/2016 | Orsini | H04L 51/12 | 704/2 |
| 2016/0170970 A1* | 6/2016 | Lindblom | G06F 17/28 | 704/3 |

* cited by examiner

LANGUAGE TRANSLATION DEVICE AND LANGUAGE TRANSLATION METHOD

CROSS-REFERENCE TO RELATED APPLICATION

This application claims the benefit of Korean Patent Application No. 10-2016-0098659, filed on Aug. 2, 2016, in the Korean Intellectual Property Office, the disclosure of which is incorporated herein in its entirety by reference.

BACKGROUND

1. Field

One or more embodiments relate to a language translation device and a language translation method, which are capable of providing a smoother user experience with improved reactivity.

2. Description of the Related Art

With the developments of communication technologies and the miniaturization of electronic devices, personal terminals have become widely spread to general customers. In particular, personal portable terminals, such as smartphones or smart tablets, have recently been widely used. Most terminals include a communication function. A user may search on the Internet using a terminal or may exchange messages with another user.

Also, with the developments of small-sized camera technologies, small-sized microphone technologies, small-sized display technologies, and small-sized speaker technologies, most terminals such as smartphones include a camera, a microphone, a display, and a speaker. A user may use the terminal to record a voice or capture a video including a voice. The user may confirm the recorded voice through the speaker included in the terminal or the captured video through the display included in the terminal.

Also, the user may share the recorded voice or the video with another user using a communication function of the terminal. The user may send a previously recorded voice or a previously captured video to another user. Also, the user may send a voice or a video, which is being currently recorded or captured by the terminal, to another user in real time.

Also, at the same time, another user may send a voice or a video, which is being currently recorded or captured by its own terminal, to the user in real time. The display included in the terminal of the user may simultaneously display the image that is being currently captured by the terminal of the user and the image that is being currently captured by the terminal of another user. Also, the speaker included in the terminal of the user may simultaneously reproduce the voice that is being currently recorded by the terminal of another user. In other words, the user and another user may make a video call to each other using their own terminals.

The user and another user may or may not be acquainted with each other. A server may be connected to a plurality of terminals including the terminal of the user and the terminal of another user. The server may mediate between the terminal of the user and the terminal of another user. Therefore, even though the user and another user are not acquainted with each other, the user and another user may make a video call to each other through the mediation of the server.

A language used by the user may be different from a language used by another user. When users making a video call use different languages, the user may not understand what the other party is saying, even though the voice of the other party is reproduced through the speaker of the terminal of the user.

SUMMARY

Some example embodiments may provide a language translation device and a language translation method, which enable users making a video call to understand what the other party is saying, even though the users use different languages.

Some example embodiments may provide a language translation device and a language translation method, which are capable of providing a smoother user experience.

Some example embodiments may provide a language translation device and a language translation method, which are capable of providing a user experience with improved reactivity.

Some example embodiments may provide a language translation device and a language translation method, which are capable of providing an improved user experience.

Additional aspects will be set forth in part in the description which follows and, in part, will be apparent from the description, or may be learned by practice of the presented embodiments.

In some example embodiments, a translation method may comprise: continuously receiving a voice recognition result for a first-language voice from a first terminal as a first-language text; continuously displaying the received voice recognition result; acquiring a second-language translation of an ended sentence included in the displayed voice recognition result; and substituting the displayed ended sentence with the acquired translation.

In some example embodiments, the continuously displaying of the received voice recognition result may include continuously displaying at least a part of the voice recognition result received till now while the voice recognition result is being received, the acquiring of the second-language translation of the ended sentence included in the displayed voice recognition result may include acquiring the second-language translation of at least one ended sentence included in the voice recognition result displayed till now while the voice recognition result is being displayed, and the substituting of the displayed ended sentence with the acquired translation may include substituting the at least one ended sentence with the acquired translation while the voice recognition result is being displayed.

In some example embodiments, the translation method may further comprise: continuously receiving voice data, which is generated by encoding the voice, from the first terminal; and continuously reproducing the voice using the received voice data. The continuously displaying of the received voice recognition result may include continuously displaying at least a part of the voice recognition result received till now while the voice is being reproduced.

In some example embodiments, the translation method may further comprise, before the substituting of the displayed ended sentence with the acquired translation, continuously substituting words included in the first-language voice recognition result with second-language words having identical or similar meaning thereto.

In some example embodiments, the substituting of the displayed ended sentence with the acquired translation may include substituting the ended sentence, at least a part of which is substituted with the second-language word, with the acquired translation.

In some example embodiments, the continuously substituting with the second-language words may comprise: receiving the second-language words having identical or similar meanings to the first-language words from the first terminal or the first server; and continuously substituting the first-language words with the received second-language words.

In some example embodiments, the continuously substituting with the second-language words may comprise: transmitting the first-language words to a first server; receiving the second-language words having identical or similar meanings to the transmitted words from the first server; and continuously substituting the first-language words with the received second-language words.

In some example embodiments, the continuously substituting with the second-language words may comprise: retrieving words included in the voice recognition result from a first database; when the second-language words corresponding to the retrieved words are present in the first database, acquiring the second-language words corresponding to the retrieved words from the first database as a result of the retrieving; and substituting the retrieved first-language words with the acquired second-language words.

In some example embodiments, the continuously substituting with the second-language words may further comprise: retrieving words included in the voice recognition result from a first database; when the second-language words corresponding to the retrieved words are not present in the first database, transmitting the retrieved words to a first server; receiving the second-language words having identical or similar meanings to the transmitted words from the first server; caching the transmitted words and the received second-language words in the first database; and substituting the transmitted first-language words with the received second-language words.

In some example embodiments, the translation method may further include calculating a similarity between a word order of the first language and a word order of the second language. The translation method may further include, before the substituting of the displayed ended sentence with the acquired translation, when the calculated similarity is greater than a reference value, continuously substituting words included in the first-language voice recognition result with the second-language words having identical or similar meaning thereto. The substituting of the displayed ended sentence with the acquired translation may include substituting the ended sentence, at least a part of which is substituted with the second-language word, with the acquired translation.

In some example embodiments, the acquiring of the second-language translation of the ended sentence included in the displayed voice recognition result may include receiving the translation from the first terminal or the second server.

In some example embodiments, the acquiring of the second-language translation of the ended sentence included in the displayed voice recognition result may comprise: detecting the ended sentence from the displayed voice recognition result; transmitting the ended sentence to a second server; and receiving the second-language translation of the ended sentence from the second server.

In some example embodiments, the acquiring of the second-language translation of the ended sentence included in the displayed voice recognition result may comprise: detecting the ended sentence from the displayed voice recognition result; retrieving the ended sentence from a second database; and when the second-language translation corresponding to the ended sentence is present in the second database, acquiring the second-language translation corresponding to the ended sentence from the second database as a result of the retrieving.

In some example embodiments, the acquiring of the second-language translation of the ended sentence included in the displayed voice recognition result may comprise: detecting the ended sentence from the displayed voice recognition result; retrieving the ended sentence from a second database; when the second-language translation corresponding to the ended sentence is not present in the second database, transmitting the ended sentence to the second server; receiving the second-language translation of the ended sentence from the second server; and caching the ended sentence and the received second-language translation in the second database.

In some example embodiments, a translation method may comprise: continuously receiving, by a first terminal, a first-language voice; continuously encoding the voice being received; continuously transmitting the encoded voice to a first server; continuously receiving a voice recognition result for the encoded voice from the first server as a first-language text; continuously transmitting the received voice recognition result to a second terminal; detecting an ended sentence from the voice being received; transmitting the first-language text corresponding to the detected sentence to a second server; receiving a second-language translation of the detected sentence from the second server as a second-language text; and transmitting the received translation to the second terminal.

In some example embodiments, the continuously encoding of the voice being received may include continuously encoding at least a part of the voice received till now while the voice is being received, the continuously transmitting of the encoded voice to the first server may include continuously transmitting at least a part of the voice encoded till now to the first server while the voice is being received, and the continuously receiving of the voice recognition result for the encoded voice from the first server as the first-language text may include continuously receiving a voice recognition result for the transmitted encoded voice from the first server as the first-language text while the voice is being received.

In some example embodiments, the continuously transmitting of the received voice recognition result to the second terminal may include continuously transmitting the received voice recognition result to the second terminal while the voice is being received, the detecting of the ended sentence from the voice being received may include detecting at least one ended sentence included in the voice recognition result transmitted till now while the voice is being received, and the transmitting of the first-language text corresponding to the detected sentence to a second server may include transmitting the first-language text corresponding to the detected at least one sentence to the second server, while the voice is being received.

In some example embodiments, the receiving of the second-language translation of the detected sentence from the second server as the second-language text may include receiving the second-language translation of the transmitted text from the second server as the second-language text while the voice is being received, and the transmitting of the received translation to the second terminal may include transmitting the received translation to the second terminal while the voice is being received.

In some example embodiments, the translation method may further comprise continuously transmitting the encoded voice to the second server. The continuously transmitting of the received voice recognition result to the second terminal may include continuously transmitting the received voice recognition result to the second terminal while the encoded voice is being received.

In some example embodiments, a translation method may comprise: continuously receiving a voice recognition result for a first-language voice from a first terminal as a first-language text; continuously transmitting the received voice recognition result to the second terminal; detecting an ended sentence from the received voice recognition result; acquiring a second-language translation of the detected sentence; and transmitting the acquired translation to the second terminal.

In some example embodiments, the continuously transmitting of the received voice recognition result to the second terminal may include continuously transmitting at least a part of the voice recognition result received till now to the second terminal while the voice recognition result is being received, the detecting of the ended sentence from the received voice recognition result may include detecting at least one ended sentence included in the voice recognition result transmitted till now, the acquiring of the second-language translation of the detected sentence may include acquiring the second-language translation of the detected at least one ended sentence, and the transmitting of the acquired translation to the second terminal may include transmitting the acquired translation to the second terminal while the voice recognition result is being received.

In some example embodiments, a translation device may comprise: a communication interface configured to continuously receive a voice recognition result for a first-language voice from a first terminal as a first-language text; and a display configured to continuously display the received voice recognition result. The communication interface may acquire a second-language translation of an ended sentence included in the displayed voice recognition result, and the display may substitute the displayed ended sentence with the acquired translation.

In some example embodiments, a translation device may comprise: an input interface configured to continuously receive a first-language voice; a controller configured to continuously encode the voice being received; and a communication interface configured to continuously transmit the encoded voice to a first server. The communication interface may continuously receive a voice recognition result for the encoded voice from the first server as a first-language text, the communication interface may continuously transmit the received voice recognition result to a second terminal, the controller may detect an ended sentence from the voice being received, the communication interface may transmit the first-language text corresponding to the detected sentence to the second server, the communication interface may receive a second-language translation of the detected sentence from the second server as a second-language text, and the communication interface may transmit the received translation to the second terminal.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Advantages and features and a method of achieving the same will be more clearly understood from embodiments described below in detail with reference to the accompanying drawings. However, the present disclosure is not limited to the following embodiments and may be implemented in various different forms. The embodiments are provided merely to complete disclosure and to provide those of ordinary skill in the art with the category of the present disclosure. The present disclosure is defined only by the claims. Wherever possible, the same reference numbers will be used throughout the specification to refer to the same or like components.

Also, it will be understood that although the terms "first", "second", etc. may be used herein to describe various components, these components should not be limited by these terms. These terms are only used to distinguish one component from another. Therefore, a first component used herein may be a second component within the technical scope of the present disclosure.

The terminology used herein is for the purpose of describing particular embodiments only and is not intended to limit the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated components and/or steps, but do not preclude the presence or addition of one or more other components and/or steps.

Unless otherwise defined, all terms used herein have the same meaning as commonly understood by those of ordinary skill in the art. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, language translation devices 100 and 150 and language translation methods, according to embodiments, will be described in detail with reference to FIGS. 1 to 25.

Figure 1:
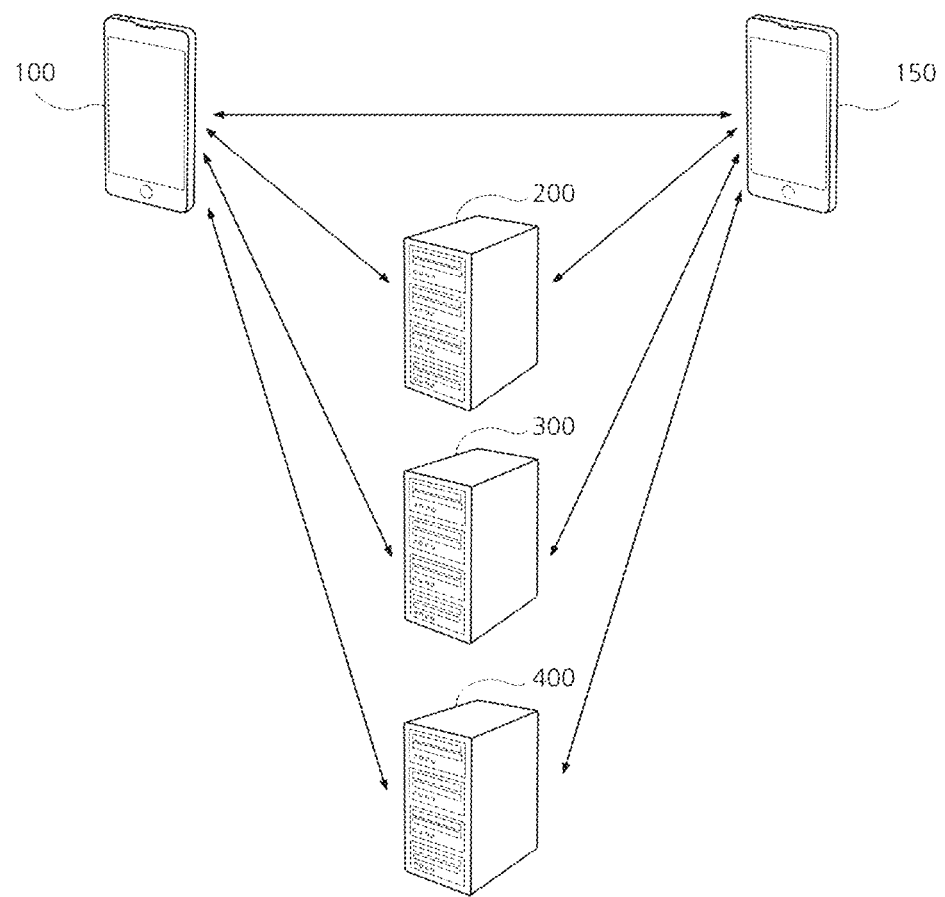
FIG. 1 is a network configuration diagram illustrating an environment in which a language translation device according to an embodiment operates.

FIG. 1 is a network configuration diagram illustrating an environment in which language translation devices 100 and 150 according to an embodiment operate. Referring to FIG. 1, the environment in which the language translation devices 100 and 150 operate may include a first language translation device 100, and a second language translation device 150 connected to the first language translation device 100.

According to another embodiment, the environment in which the language translation devices 100 and 150 operate may further include a first server 200 connected to the first language translation device 100 or the second language translation device 150. According to another embodiment, the environment in which the language translation devices 100 and 150 operate may further include a second server 300 connected to the first language translation device 100 or the second language translation device 150. According to another embodiment, the environment in which the language translation devices 100 and 150 operate may further include a third server 400 connected to the first language translation device 100 or the second language translation device 150.

The environment in which the language translation devices 100 and 150 may not include any of the first to third servers 200 to 400. According to another embodiment, the environment in which the language translation devices 100 and 150 may include at least a part of the first to third servers 200 to 400.

The first language translation device 100 may be a terminal. For convenience of description, the first language translation device 100 and the first terminal 100 are interchangeably used herein. The first terminal 100 may be, for example, a desktop computer, a laptop computer, a smartphone, a smart tablet, a smart watch, a mobile terminal, a digital camera, a wearable device, or a portable electronic device. The first terminal 100 may execute programs or applications.

The first terminal 100 may be connected to a communication network. The first terminal 100 may be connected to an external device via the communication network. The first terminal 100 may transmit data to the connected external device or receive data from the connected external device.

The communication network may include a wired communication network, a wireless communication network, or a composite communication network. The communication network may include a mobile communication network such as 3G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency Identification (RFID), Near Field Communication (NFC), ZigBee, Z-Wave, Bluetooth, Bluetooth Low Energy (BLE), or Infra-Red (IR) communication. The communication network may include Local Area Network (LAN), Metropolitan Area Network (MAN), or Wide Area Network (WAN).

Figure 2:
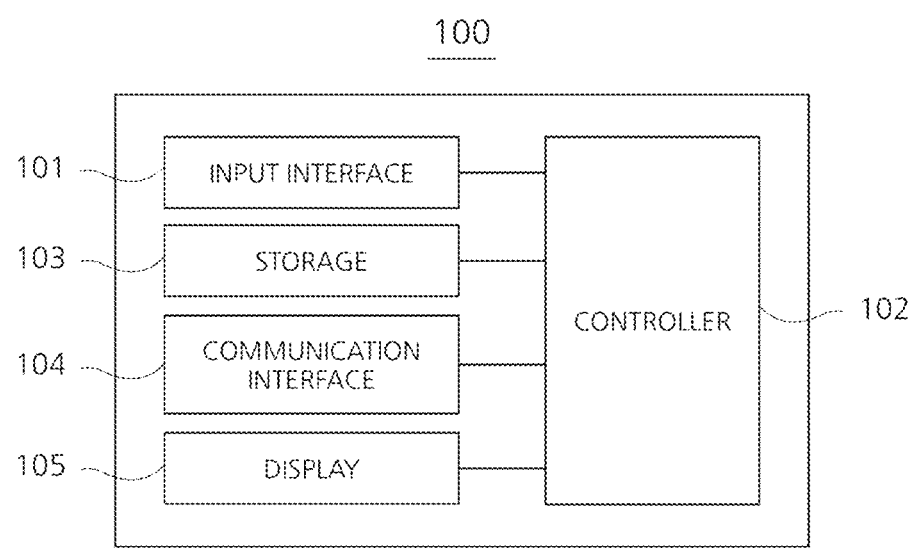
FIG. 2 is a block diagram illustrating a configuration of a language translation device according to an embodiment.

FIG. 2 is a block diagram illustrating the configurations of the language translation devices 100 and 150 according to an embodiment. Referring to FIG. 2, each of the language translation devices 100 and 150 according to an embodiment may include an input interface 101, a controller 102, a storage 103, a communication interface 104, and a display 105.

The input interface 101 may receive an external signal. The input interface 101 may receive signals from users of the language translation devices 100 and 150. Also, the input interface 101 may receive a signal from an external device.

The input interface 101 may include, for example, a microphone, a camera, a keyboard, a mouse, a track ball, a touch screen, a button, a switch, a sensor, a network interface, or other input devices. The input interface 101 may receive a voice from the exterior through the microphone included in the input interface 101. The input interface 101 may receive voices from the users of the language translation devices 100 and 150. Also, the input interface 101 may receive a voice from an external voice reproduction device.

The controller 102 may control operations of the language translation devices 100 and 150. The controller 102 may be connected to the components included in the language translation devices 100 and 150. The controller 102 may control operations of the components included in the language translation devices 100 and 150. The controller 102 may control the operations of the language translation devices 100 and 150 in response to a signal received by the input interface 101.

Also, the controller 102 may process a signal. The controller 102 may process a signal received by the input interface 101. For example, the controller 102 may process a signal received through the microphone included in the input interface 101.

Also, the controller 102 may perform an arithmetic operation. The controller 102 may perform an arithmetic operation according to a signal received by the input interface 101. The controller 102 may perform an arithmetic operation using a signal received by the input interface 101 or data stored in the storage 103. For example, the controller 102 may encode a voice received through the microphone included in the input interface 101. The controller 102 may perform control such that the result of the arithmetic operation is stored in the storage 103. The controller 102 may perform control such that the result of the arithmetic operation is displayed on the display 105.

The controller 102 may include, for example, a central processing unit (CPU), a graphic processing unit (GPU), a micro controller unit (MCU), or a microprocessor.

The storage 103 may store data. The storage 103 may store the result of the arithmetic operation performed by the controller 102. For example, the storage 103 may store a voice encoded by the controller 102. The storage 103 may store data to be transmitted to the exterior through the communication interface 104, or may store data received from the exterior through the communication interface 104.

The storage 103 may include a volatile memory or a non-volatile memory. The storage 103 may include, for example, flash memory, read-only memory (ROM), random access memory (RAM), electrically erasable read-only memory (EEROM), erasable programmable read-only memory (EPROM), electrically erasable and programmable read-only memory (EEPROM), hard disk drive (HDD), register, or the like. The storage 103 may include, for example, a file system, a database, or an embedded database.

The communication interface 104 may transmit data to the exterior or receive data from the exterior. The communication interface 104 may transmit data to the language translation devices 100 and 150, the first server 200, the second server 300, or the third server 400. The communication interface 104 may receive data from the language translation devices 100 and 150, the first server 200, the second server 300, or the third server 400. The communication interface 104 may transmit the result of the arithmetic operation performed by the controller 102 to the exterior. Also, the communication interface 104 may transmit data stored in the storage 103 to the exterior.

Data to be transmitted by the communication interface 104 or data received by the communication interface 104 may be stored in the storage 103. For example, the communication interface 104 may transmit the encoded voice stored in the storage 103 to the first server 200. Also, the communication interface 104 may receive a voice recognition result for the encoded voice from the first server 200 as a response to the transmission of the encoded voice.

The communication interface 104 may include a long-range network interface such as a 3G module, an LTE module, an LTE-A module, a Wi-Fi module, a WiGig module, an Ultra Wide Band (UWB) module, or a LAN card. Also, the communication interface 104 may include a short-range network interface such as an MST module, a Bluetooth module, an NFC module, an RFID module, a ZigBee module, a Z-Wave module, or an IR module. Also, the communication interface 104 may include other network interfaces.

The display 105 may display a screen. The controller 102 may control the display 105 to display a screen. The display 105 may display a user interface. The display 105 may display another screen in response to a user input.

The display 105 may display data. The display 105 may display the result of the arithmetic operation performed by the controller 102. The display 105 may display data stored in the storage 103. The display 105 may display data received by the communication interface 104. For example, the display 105 may display the voice recognition result received from the first server 200.

The display 105 may include a flat-panel display device such as a liquid crystal display (LCD), an organic light-emitting diode (OLED), or a plasma display panel (PDP). The display 140 may include a curved display or a flexible display. The display 105 may include a touch screen.

The second language translation device 150 may be a terminal. For convenience of description, the second language translation device 150 and the second terminal 150 are interchangeably used herein. A type of the second terminal 150 may be identical to or different from a type of the first terminal 100. The second terminal 150 may execute programs or applications.

The second terminal 150 may be connected to a communication network. The second terminal 150 may be connected to an external device via the communication network. The second terminal 150 may transmit data to the connected external device or receive data from the connected external device.

The second terminal 150 may be connected to the first terminal 100. The second terminal 150 may be connected to the first terminal 100 via the communication network. The second terminal 150 may transmit data to the first terminal 100 or receive data from the first terminal 100.

The first terminal 100 and the second terminal 150, which are connected to each other, may exchange messages, files, voice data, images, or videos with each other. Also, the first terminal 100 and the second terminal 150 may make a voice call or a video call to each other.

The first terminal 100 and the second terminal 150 may directly exchange data with each other. Also, the first terminal 100 and the second terminal 150 may exchange data with each other via the first server 200, the second server 300, the third server 400, or other mediating devices.

A language used by the user of the first terminal 100 may be identical to or different from a language used by the user of the second terminal 150. The language used by the first terminal 100 may be a first language. The first language may be, for example, Korean, English, Japanese, Chinese, German, French, Spanish, or Italian. The language used by the second terminal 150 may be a second language. The second language may be, for example, Korean, English, Japanese, Chinese, German, French, Spanish, or Italian. The first language and the second language may be identical to or different from each other.

The first server 200 may be connected to the first terminal 100 or the second terminal 150. When the first server 200 is connected to the first terminal 100, the first server 200 may exchange data with the first terminal 100 via the communication network. When the first server 200 is connected to the second terminal 150, the first server 200 may exchange data with the second terminal 150 via the communication network.

The first server 200 may be a dictionary server. The first server 200 may provide a dictionary service. The first server 200 may receive a first-language word from the first terminal 100 or the second terminal 150. The first server 200 may use the received first-language word to acquire a second-language word having a meaning identical to or similar to a meaning of the first-language word. The first server 200 may transmit the acquired second-language word to the first terminal 100 or the second terminal 150.

The second server 300 may be connected to the first terminal 100 or the second terminal 150. When the second server 300 is connected to the first terminal 100, the second server 300 may exchange data with the first terminal 100 via the communication network. When the second server 300 is connected to the second terminal 150, the second server 300 may exchange data with the second terminal 150 via the communication network.

The second server 300 may be a translation server. The second server 300 may provide a translation service. The second server 300 may receive a first-language sentence from the first terminal 100 or the second terminal 150. The second server 300 may use the received first-language sentence to acquire a second-language translation of the sentence. The second server 300 may transmit the acquired translation to the first terminal 100 or the second terminal 150.

The third server 400 may be connected to the first terminal 100 or the second terminal 150. When the third server 400 is connected to the first terminal 100, the third server 400 may exchange data with the first terminal 100 via the communication network. When the third server 400 is connected to the second terminal 150, the third server 400 may exchange data with the second terminal 150 via the communication network.

The third server 400 may be a voice recognition server. The third server 400 may provide a voice recognition service. The third server 400 may receive an encoded voice from the first terminal 100 or the second terminal 150. The third server 400 may perform voice recognition using the encoded voice. The third server 400 may convert the encoded voice into a text as the voice recognition result. The third server 400 may transmit the converted text to the first terminal 100 or the second terminal 150.

Hereinafter, specific operations of the language translation devices 100 and 150 according to an embodiment will be described in detail with reference to FIGS. 3 to 25.

Figure 3:
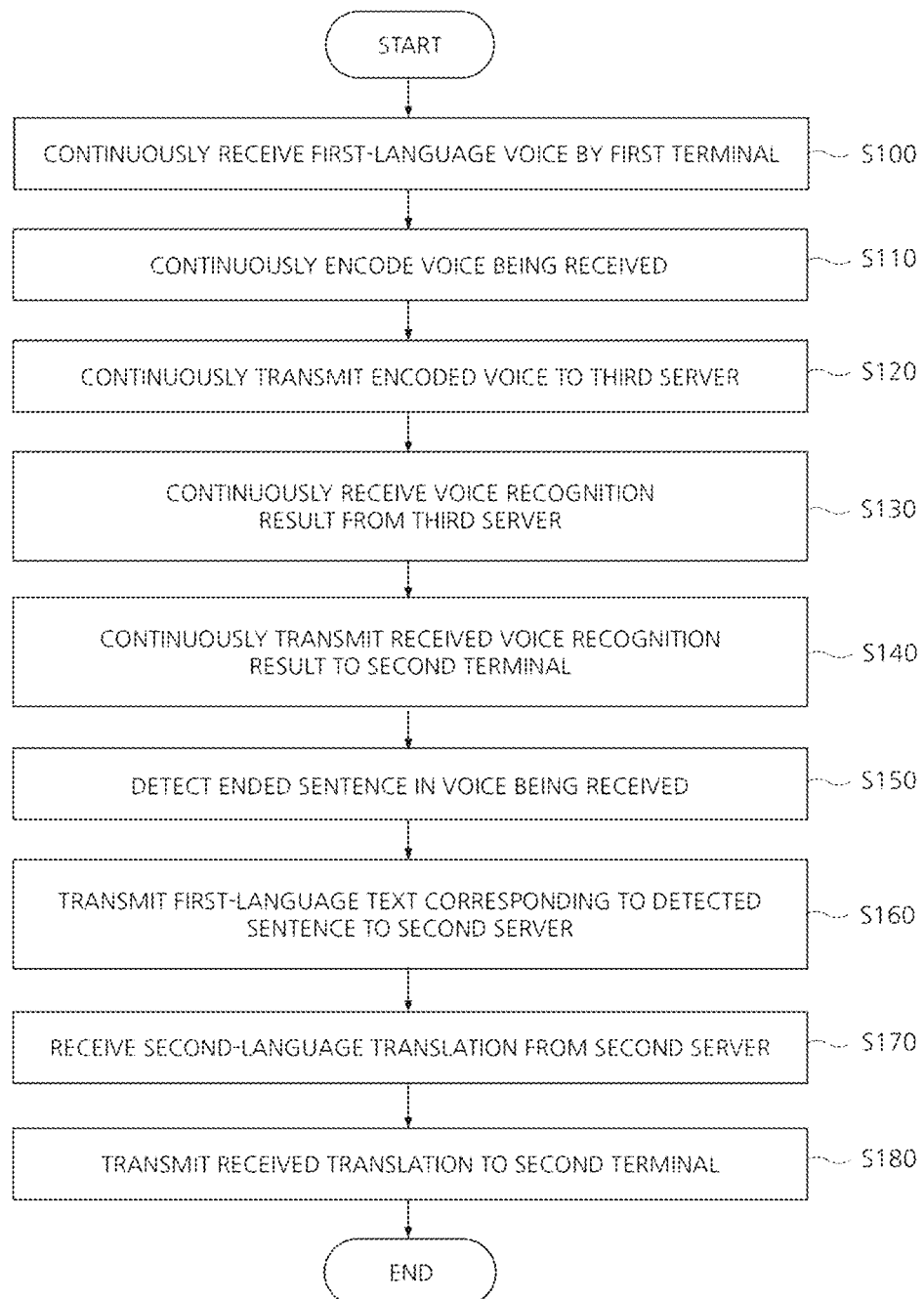
FIG. 3 is a flowchart of a language translation method that is performed by a first terminal, according to an embodiment.

FIG. 3 is a flowchart of a language translation method that is performed by the first terminal 100, according to an embodiment. Referring to FIG. 3, in operation S100, the first terminal 100 may continuously receive a first-language voice.

The user of the first terminal 100 may speak in the first language toward the first terminal 100. Also, an external reproduction device may reproduce the first-language voice toward the first terminal 100. The first language may be, for example, Korean, English, Japanese, Chinese, German, French, Spanish, or Italian.

Figure 4:
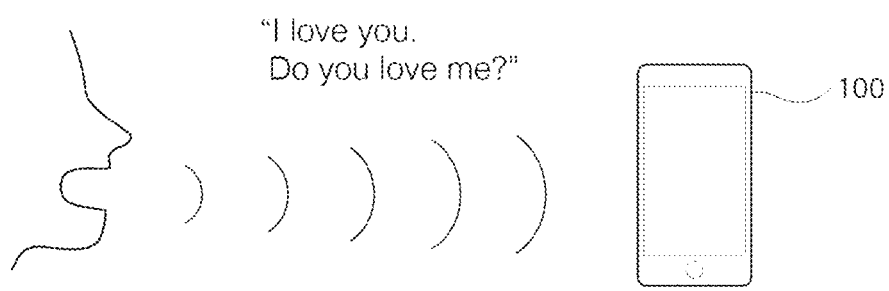
FIG. 4 is a reference diagram for describing a process of continuously receiving a first-language voice by the first terminal, according to an embodiment.

FIG. 4 is a reference diagram for describing operation S100 of continuously receiving the first-language voice by the first terminal 100, according to an embodiment. As illustrated in FIG. 4, the user of the first terminal 100 may speak in English toward the first terminal 100. In other words, the first language may be English. The user may speak two sentences "I love you. Do you love me?" in English.

The first terminal 100 may continuously receive the first-language voice through the microphone included in the input interface 101 of the first terminal 100. The first terminal 100 may receive the voice at the same time as the user's speaking. When the user speaks, the first terminal 100 may receive the voice in real time. When the user continuously speaks, the first terminal 100 may continuously receive the voice.

Referring to FIG. 3 again, in operation S110, the voice being received may be continuously encoded. The controller 102 of the first terminal 100 may encode the voice being continuously received by the input interface 101. While the voice is being received, the controller 102 of the first terminal 100 may continuously encode at least a part of the voice received till now.

The controller 102 may encode the voice to converter the voice (analog signal) into an encoded voice (digital signal). The encoded voice may be stored in the storage 103. The controller 102 may perform acoustic echo cancellation to reduce echo phenomenon.

The controller 102 may continuously encode the voice being received. The controller 102 may encode the voice at the same time as the reception of the voice. When the voice is received, the controller 102 may encode the voice in real time. When the voice is continuously received, the controller 102 may continuously encode the voice.

In operation S120, the encoded voice may be continuously transmitted to the third server 400. The third server 400 may be a server that provides a voice recognition service. While the voice is being received, the communication interface 104 of the first terminal 100 may continuously transmit at least a part of the voice encoded till now to the third server 400.

The communication interface 104 of the first terminal 100 may continuously transmit the encoded voice to the third server 400. The communication interface 104 may transmit the encoded voice to the third server 400 at the same time as the encoding of the voice. When the voice is encoded, the communication interface 104 may transmit the encoded voice in real time. When the voice is continuously encoded, the communication interface 104 may continuously transmit the encoded voice.

In addition, the communication interface 104 of the first terminal 100 may additionally continuously transmit the encoded voice to the second terminal 150. The communication interface 104 may transmit the encoded voice to the second terminal 150 at the same time as the encoding of the voice. The second terminal 150 may continuously receive the encoded voice from the first terminal 100. The second terminal 150 may continuously decode the received encoded voice. The second terminal 150 may continuously reproduce the decoded voice.

In operation S130, the voice recognition result for the encoded voice may be continuously received from the third server 400 as a first-language text. The communication interface 104 of the first terminal 100 may receive the voice recognition result for the encoded voice from the third server 400 as a response to the transmission of the encoded voice. While the voice is being received, the communication interface 104 of the first terminal 100 may continuously receive the voice recognition result from the first server 200.

The communication interface 104 may receive the voice recognition result as the first-language text. When the first language is English, the communication interface 104 may receive an English text as the voice recognition result.

The third server 400 may transmit the voice recognition result to the first terminal 100 at the same time as the recognition of the encoded voice. When the encoded voice is recognized, the third server 400 may transmit the voice recognition result in real time. When the encoded voice is continuously recognized, the third server 400 may continuously transmit the voice recognition result. The communication interface 104 of the first terminal 100 may continuously receive the voice recognition result from the third server 400.

In operation S140, the received voice recognition result may be continuously transmitted to the second terminal 150. While the voice is being received, the communication interface 104 of the first terminal 100 may continuously transmit the received voice recognition result to the second terminal 150. While the encoded voice is being transmitted, the communication interface 104 may continuously transmit the voice recognition result to the second terminal 150.

The communication interface 104 of the first terminal 100 may continuously transmit the received voice recognition result to the second terminal 150. The communication interface 104 may transmit the voice recognition result to the second terminal 150 at the same time as the reception of the voice recognition result. When the voice recognition result is received, the communication interface 104 may transmit the voice recognition result in real time. When the voice recognition result is continuously received, the communication interface 104 may continuously transmit the voice recognition result.

The second terminal 150 may continuously receive the voice recognition result from the first terminal 100. The second terminal 150 may continuously display the received voice recognition result.

In operation S150, an ended sentence may be detected in the voice being received. The ended sentence may refer to a sentence that includes all sentence components necessary for completing one whole sentence. While the voice is being received, the controller 102 of the first terminal 100 may detect at least one ended sentence included in the voice recognition result transmitted till now. While the voice recognition result is being continuously transmitted to the second terminal 150, the controller 102 of the first terminal 100 may detect at least one ended sentence from the voice recognition result transmitted till now.

For example, it is assumed that the voice recognition result transmitted to the second terminal 150 till now is a "I love you. Do" part in two sentences of FIG. 4. The controller 102 may detect "I love you." from the above part as one ended sentence.

Referring to FIG. 3 again, in operation S160, a first-language text corresponding to the detected sentence may be transmitted to the second server 300. The second server 300 may be a server that provides a translation service. The communication interface 104 of the first terminal 100 may transmit the detected sentence to the second server 300 as the first-language text. While the voice is being received, the communication interface 104 may transmit the detected at least one ended sentence to the second server 300. For example, the communication interface 104 may transmit an English text "I love you." to the second server 300.

In operation S170, a second-language translation of the detected sentence may be received from the second server 300 as a second-language text. The second server 300 may convert a first-language sentence into a second-language translation of the sentence. The second server 300 may transmit the converted translation to the first terminal 100.

The communication interface 104 of the first terminal 100 may receive the second-language translation of the detected sentence from the second server 300 as a response to the transmission of the detected sentence. While the voice is being received, the communication interface 104 of the first terminal 100 may receive a second-language translation of the transmitted text from the second server 300. The communication interface 104 may receive a second-language text as the second-language translation.

The second language may be, for example, Korean. The communication interface 104 may receive "나는 당신을 사랑합니다 ." as the second-language translation of "I love you."

In operation S180, the received translation may be transmitted to the second terminal 150. The communication interface 104 of the first terminal 100 may transmit the received translation to the second terminal 150. While the voice is being received, the communication interface 104 of the first terminal 100 may transmit the received translation to the second terminal 150.

The second terminal 150 may receive the second-language translation from the first terminal 100. The second terminal 150 may substitute the ended sentence included in the first-language voice recognition result with the received sentence.

Figure 5:
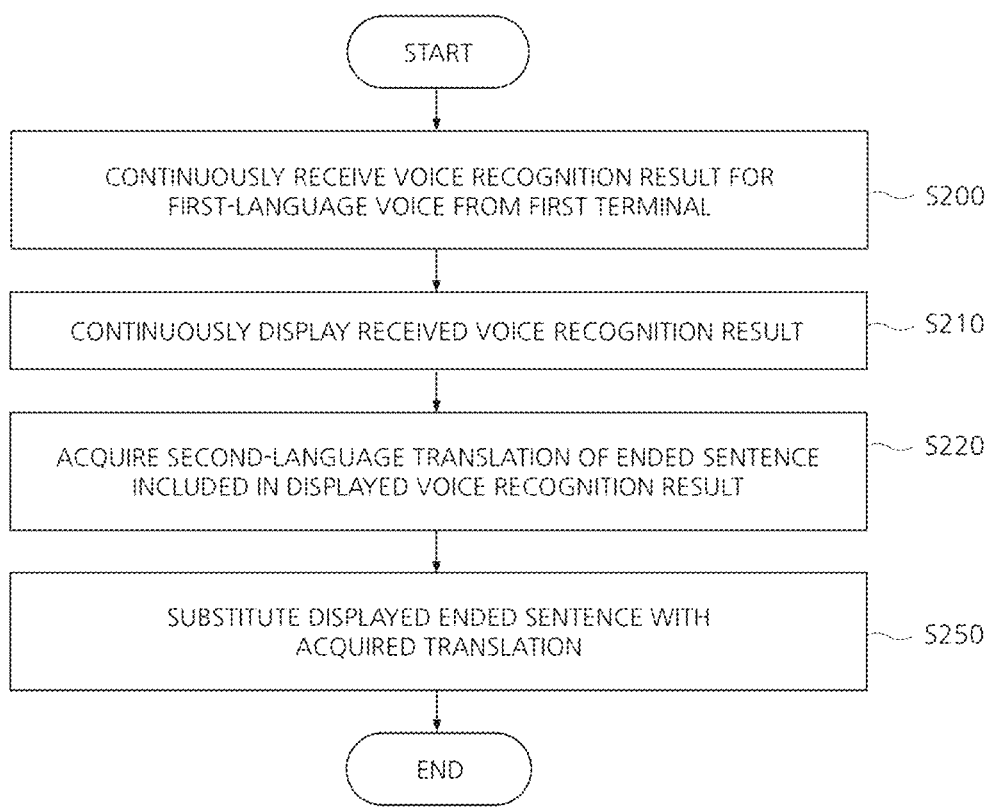
FIG. 5 is a flowchart of a language translation method that is performed by a second terminal, according to an embodiment.

FIG. 5 is a flowchart of a language translation method that is performed by the second terminal 150, according to an embodiment. Referring to FIG. 5, in operation S200, a voice recognition result for a first-language voice may be continuously received from the first terminal 100 as a first-language text.

In operation S140, the first terminal 100 may continuously transmit a voice recognition result received from the third server 400 to the second terminal 150. The communication interface 104 of the second terminal 150 may continuously receive the voice recognition result from the first terminal 100 in response to the transmission of the voice recognition result. When the first terminal 100 continuously transmits the voice recognition result, the second terminal 150 may continuously receive the voice recognition result. The storage 103 of the second terminal 150 may store the received voice recognition result.

In operation S210, the received voice recognition result may be continuously displayed. While the voice recognition result is being received, the display 105 of the second terminal 150 may continuously display at least a part of the voice recognition result received till now.

The display 105 of the second terminal 150 may continuously display the voice recognition result. The display 105 may display the voice recognition result at the same time as the reception of the voice recognition result. When the voice recognition result is received, the display 105 may display the voice recognition result in real time. When the voice recognition result is continuously received, the display 105 may continuously display the voice recognition result.

Also, the communication interface 104 of the second terminal 150 may continuously receive voice data, which is generated by encoding the voice, from the first terminal 100. The second terminal 150 may decode the received voice data. The second terminal 150 may continuously reproduce the decoded voice. While the voice is being reproduced, the display 105 of the second terminal 150 may continuously display at least a part of the voice recognition result received till now.

In this manner, even before acquiring the second-language translation of the ended sentence included in the voice recognition result, words that the user of the first terminal 100 speaks may be displayed on the second terminal 150 in real time. Even though a pronunciation of a first-language word is quite different from a pronunciation of a second-language word, a notation of the first-language word may be similar to a notation of the second-language word corresponding to the word. Therefore, even though the user of the second terminal 150 does not understand what the user of the first terminal 100 says through voice, the user of the second terminal 150 can have help from the first-language word displayed on the second terminal 150.

Therefore, according to an embodiment, even before acquiring the second-language translation of the ended sentence included in the voice recognition result, the user of the second terminal 150 can earlier understand the meaning of the words that the user of the first terminal 100 speaks. In other words, it is possible to reduce the time required for the user of the second terminal 150 to wait until the user of the second terminal 150 can understand the meaning of the words that the user of the first terminal 100 speaks. Therefore, according to an embodiment, a smoother user experience can be provided. Also, according to an embodiment, a user experience with improved reactivity can be provided. Furthermore, according to an embodiment, an improved user experience can be provided.

Figure 6:
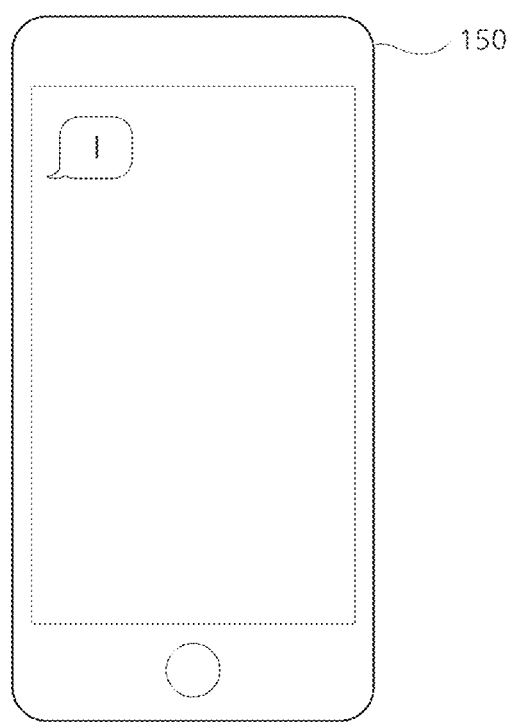
FIG. 6 is a reference diagram for describing a process of continuously displaying a received voice recognition result, according to an embodiment.
Figure 7:
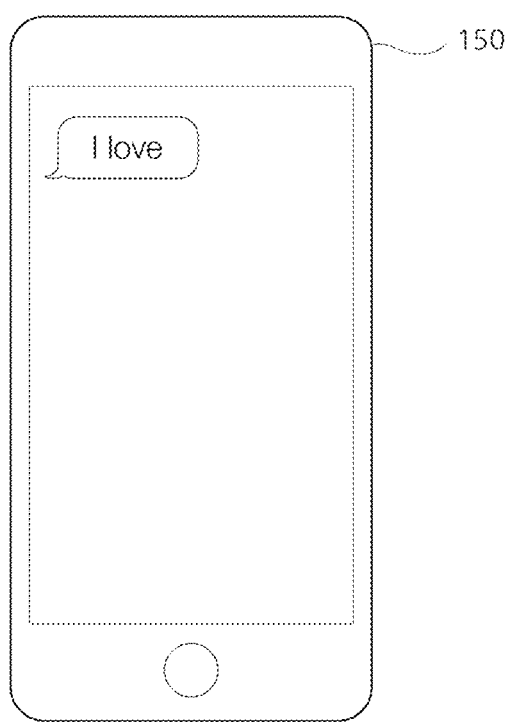
FIG. 7 is another reference diagram for describing a process of continuously displaying a received voice recognition result, according to an embodiment.
Figure 8:
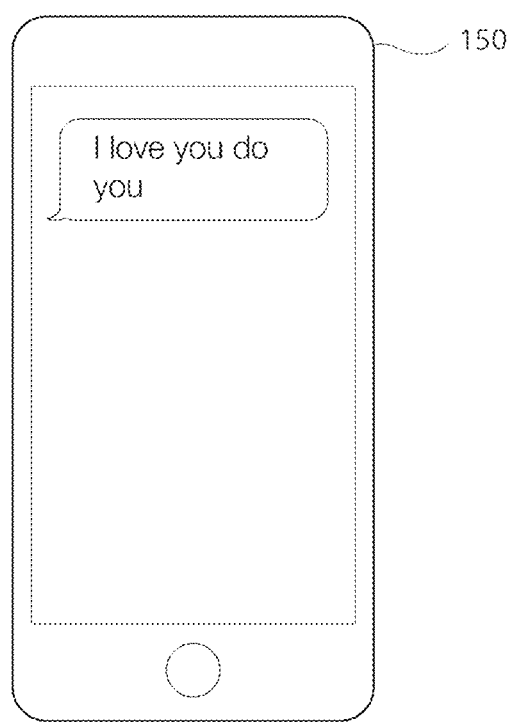
FIG. 8 is another reference diagram for describing a process of continuously displaying a received voice recognition result, according to an embodiment.

FIGS. 6 to 8 are reference diagrams for describing operation S210 of continuously displaying the received voice recognition result, according to an embodiment. Referring to FIG. 6, the second terminal 150 may receive "I" as a voice recognition result of an English voice. The display 105 of the second terminal 150 may display "I". Referring to FIG. 7, the second terminal 150 may additionally receive "love" as a voice recognition result. The display 105 of the second terminal 150 may display "I love". Referring to FIG. 8, the second terminal 150 may additionally receive "you do you" as a voice recognition result. The display 105 of the second terminal 150 may display "I love you do you".

Referring to FIG. 5 again, in operation S220, a second-language translation of an ended sentence included in the displayed voice recognition result may be acquired. While the voice recognition result is being displayed, the second terminal 150 may acquire the second-language translation of the at least one ended sentence included in the voice recognition result displayed till now.

In operation S180, the first terminal 100 may transmit the second-language translation of the ended sentence, which is included in the voice recognition result, to the second terminal 150. The second terminal 150 may receive the translation from the first terminal 100 as a response to the transmission of the translation.

Figure 9:
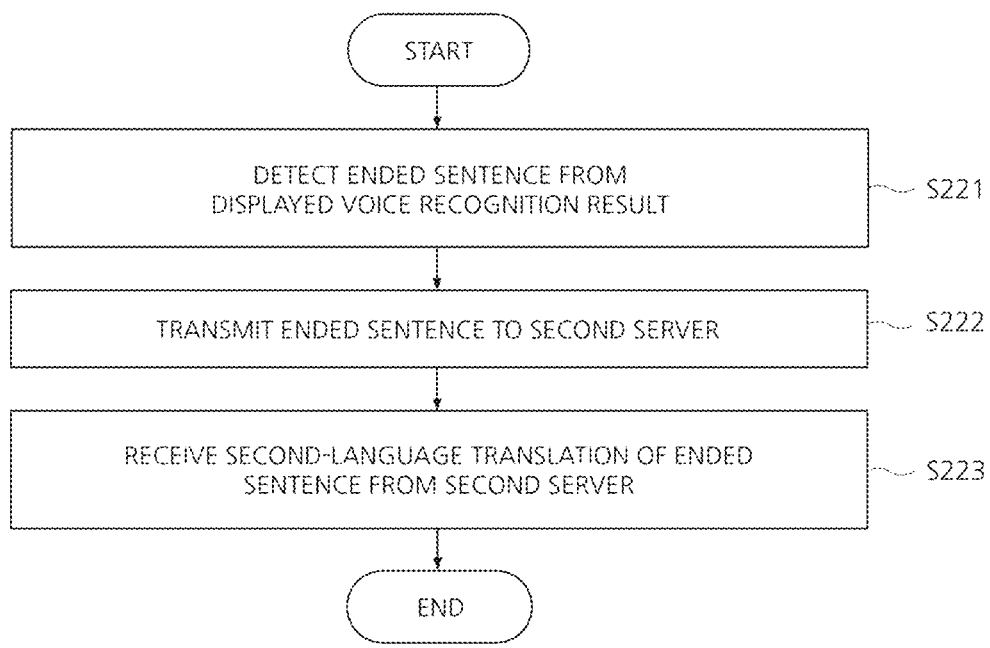
FIG. 9 is a flowchart of a process of acquiring a second-language translation of an ended sentence included in a displayed voice recognition result, according to an embodiment.

Also, according to an embodiment, the second terminal 150 may acquire the translation using other methods, instead of receiving the translation from the first terminal 100. For example, the second terminal 150 may acquire the translation by receiving the translation from the second server 300. FIG. 9 is a flowchart of operation S220 of acquiring a second-language translation of an ended sentence included in a displayed voice recognition result, according to another embodiment.

Referring to FIG. 9, in operation S221, the ended sentence may be detected from the displayed voice recognition result. The controller 102 of the second terminal 150 may detect at least one ended sentence included in the voice recognition result displayed till now.

For example, referring to FIG. 8, the voice recognition result displayed till now may be "I love you do you". The controller 102 of the second terminal 150 may detect "I love you." from the voice recognition result as one ended sentence.

Referring to FIG. 9 again, in operation S222, the ended sentence may be transmitted to the second server 300. The communication interface 104 of the second terminal 150 may transmit the detected sentence to the second server 300. The second server 300 may receive the detected sentence from the second terminal 150. The second server 300 may translate the received sentence into a second language. The second server 300 may transmit the second-language translation to the second terminal 150.

In operation S223, the second-language translation of the ended sentence may be received from the second server 300. The communication interface 104 of the second terminal 150 may receive the translation from the second server 300. For example, the second terminal 150 may receive "나는 당신을 사랑합니다." as a Korean translation.

Figure 10:
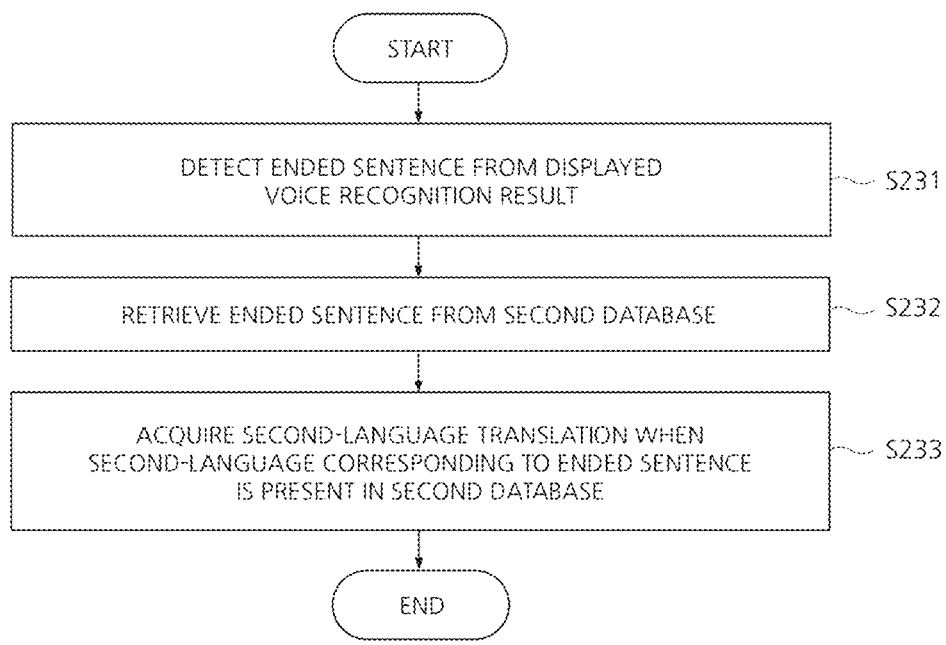
FIG. 10 is a flowchart of a process of acquiring a second-language translation of an ended sentence included in a displayed voice recognition result, according to another embodiment.

Also, according to another embodiment, the second terminal 150 may acquire the translation using other methods. For example, the second terminal 150 may acquire the translation from a translation database. FIG. 10 is a flowchart of operation S220 of acquiring a second-language translation of an ended sentence included in a displayed voice recognition result, according to another embodiment.

Referring to FIG. 10, in operation S231, the ended sentence may be detected from the displayed voice recognition result. The controller 102 of the second terminal 150 may detect at least one ended sentence included in the voice recognition result displayed till now.

In operation S232, the ended sentence may be retrieved from a second database. The storage 103 of the second terminal 150 may include the second database. According to another embodiment, the second database may be disposed outside the second terminal 150.

The second database may be a translation database. The second database may be a relational database in which first-language sentences and second-language translations of the sentences are stored. Records included in the second database may include the first-language sentences and the second-language translations of the sentences.

The controller 102 of the second terminal 150 may retrieve the first-language ended sentence from the second database. In this manner, the controller 102 may determine whether a translation corresponding to the ended sentence is present in the second database.

In operation S233, when the second-language translation corresponding to the ended sentence is present in the second database, the translation may be acquired from the second database as a result of the retrieving. When a record corresponding to the ended sentence is included in the second database, the controller 102 of the second terminal 150 may acquire the translation from the second database.

Figure 11:
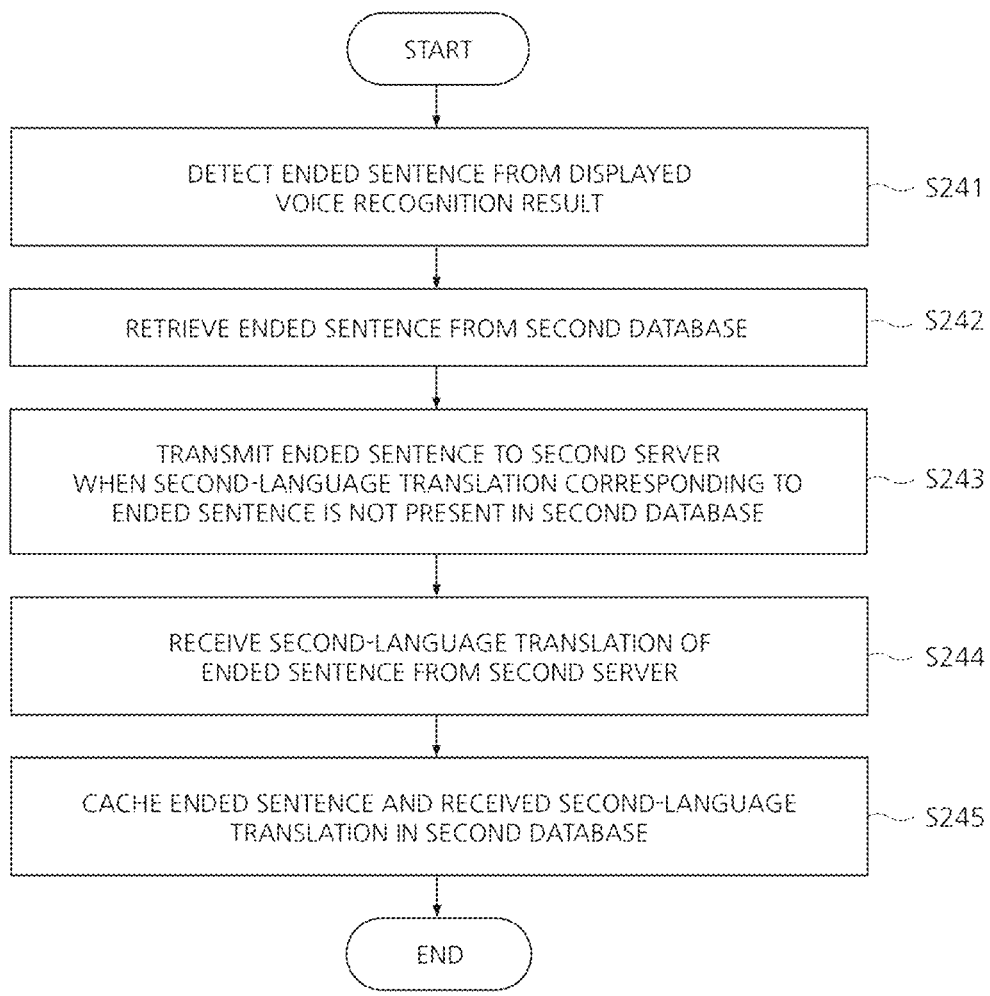
FIG. 11 is a flowchart of a process of acquiring a second-language translation of an ended sentence included in a displayed voice recognition result, according to another embodiment.

When the record corresponding to the ended sentence is not included in the second database, the second terminal 150 may acquire the translation by receiving the translation from the second server 300. FIG. 11 is a flowchart of operation S220 of acquiring a second-language translation of an ended sentence included in a displayed voice recognition result, according to another embodiment.

Referring to FIG. 11, in operation S241, the ended sentence may be detected from the displayed voice recognition result. In operation S242, the ended sentence may be retrieved from a second database.

In operation S243, when the second-language translation corresponding to the ended sentence is not present in the second database, the ended sentence may be transmitted to the second server 300. The communication interface 104 of the second terminal 150 may transmit the ended sentence to the second server 300. The second server 300 may receive the ended sentence. The second server 300 may translate the ended sentence into a second language. The second server 300 may transmit the second-language translation to the second terminal 150.

In operation S244, the second-language translation of the ended sentence may be received from the second server 300. The communication interface 104 of the second terminal 150 may receive the translation from the second server 300.

In operation S245, the ended sentence and the received second-language translation may be cached in the second database. The second terminal 150 may store the ended sentence and the received second-language translation in the second database. The second database may newly generate records including the ended sentence and the received translation. Accordingly, when the ended sentence is retrieved from the second database next time, the second terminal 150 may be ready to acquire the translation as a result of the retrieving.

Referring to FIG. 5 again, in operation S250, the displayed ended sentence may be substituted with the acquired translation. The display 105 of the second terminal 150 may substitute the displayed ended sentence with the acquired translation. While the voice recognition result is being displayed, the display 105 may substitute the at least one ended sentence with the acquired translation.

Figure 12:
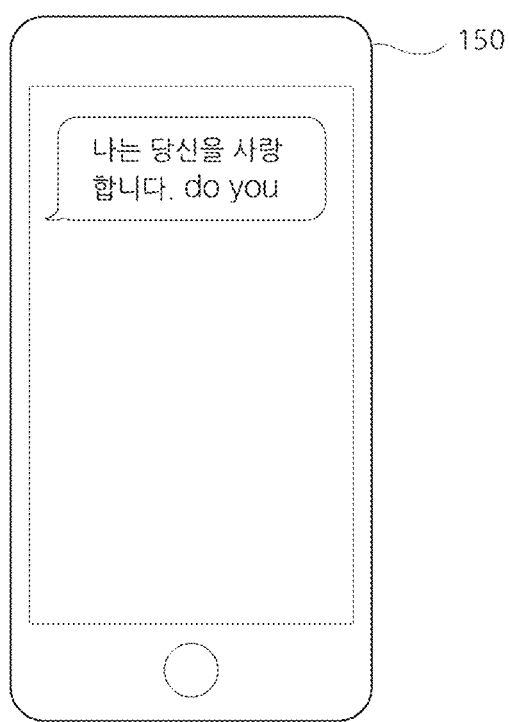
FIG. 12 is a reference diagram for describing a process of substituting a displayed ended sentence with an acquired translation, according to an embodiment.

FIG. 12 is a reference diagram for describing operation S250 of substituting the displayed ended sentence with the acquired translation, according to an embodiment. As illustrated in FIG. 12, the display 105 may substitute "I love you" displayed in FIG. 8 with "나는 당신을 사랑합니다."

Figure 13:
FIG. 13 is another reference diagram for describing a process of continuously displaying a received voice recognition result, according to an embodiment.

The communication interface 104 of the second terminal 150 may continuously receive a first-language voice recognition result from the first terminal 100 since then. The display 105 of the second terminal 150 may continuously display the received voice recognition result since then. For example, as illustrated in FIG. 13, the communication interface 104 may additionally receive "love me" as the voice recognition result. The display 105 may display "나는 당신을 사랑합니다. do you love me."

Figure 14:
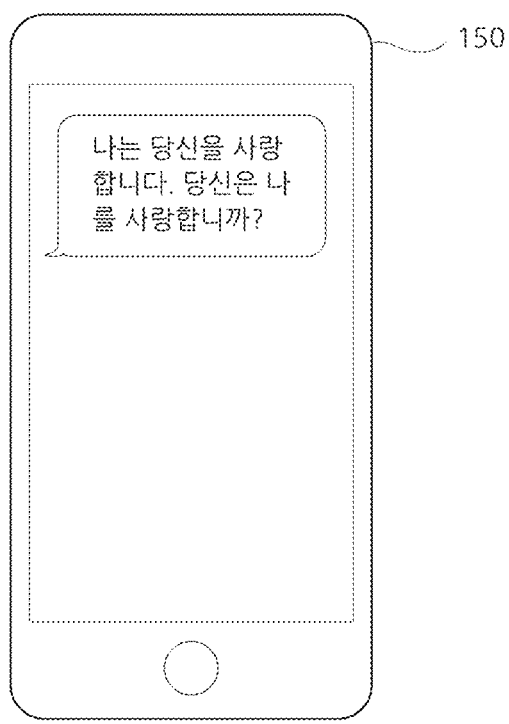
FIG. 14 is another reference diagram for describing a process of substituting a displayed ended sentence with an acquired translation, according to an embodiment.

Also, the controller 102 of the second terminal 150 may detect an ended sentence from the first-language voice recognition result since then. Referring to FIG. 13, the controller 102 may detect the "do you love me" part as one ended sentence. The controller 102 may acquire a second-language translation of the detected sentence. The display 105 of the second terminal 150 may substitute the detected sentence with the acquired translation. For example, as illustrated in FIG. 14, the display 105 may substitute the "do you love me" part with "당신은 나를 사랑합니까?."

Figure 15:
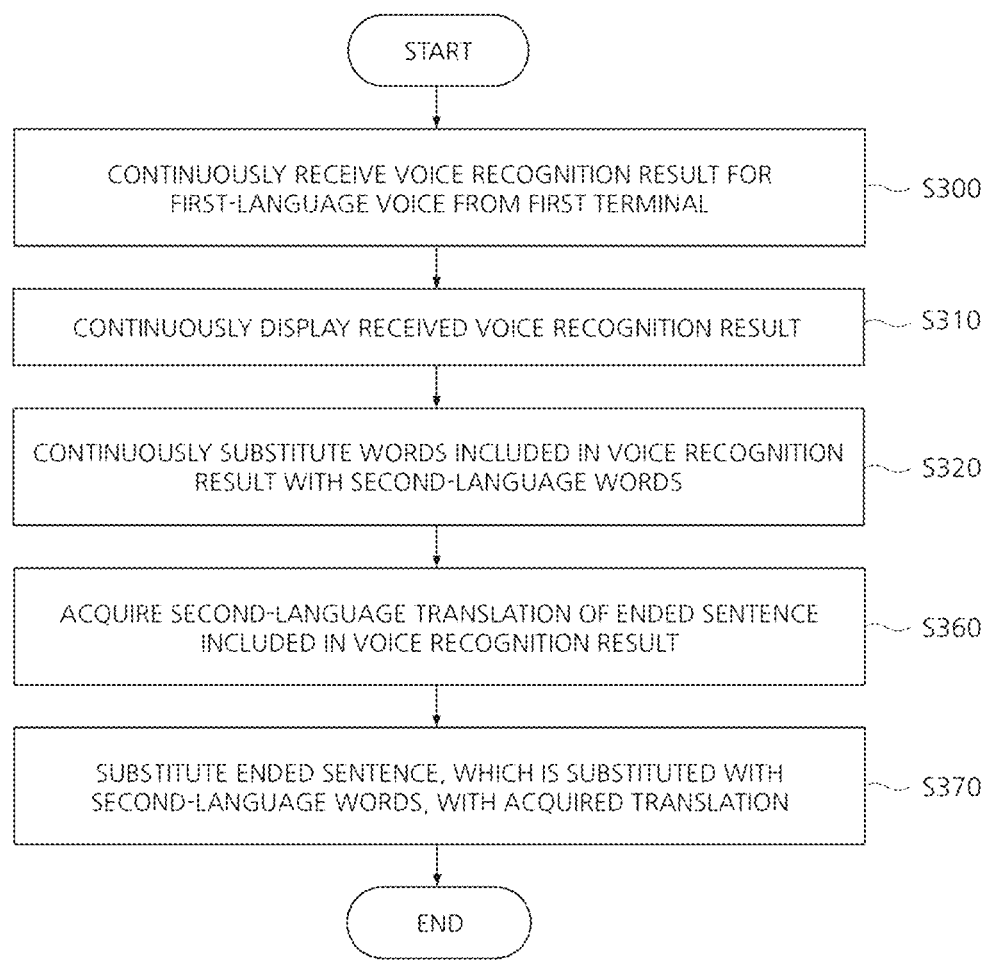
FIG. 15 is a flowchart of a language translation method that is performed by a second terminal, according to another embodiment.

FIG. 15 is a flowchart of a language translation method that is performed by the second terminal 150, according to another embodiment. Referring to FIG. 15, in operation S300, a voice recognition result for a first-language voice may be continuously received from the first terminal 100 as a first-language text. In operation S310, the received voice recognition result may be continuously displayed.

In operation S320, words included in the first-language voice recognition result may be continuously substituted with second-language words having identical or similar meaning thereto. The display 105 of the second terminal 150 may continuously substitute the first-language words with the second-language words.

In this manner, even before acquiring the second-language translation of the ended sentence included in the voice recognition result, words that can be understood by the user of the second terminal 150 may be displayed as early as possible. Therefore, it is possible to reduce the time required for the user of the second terminal 150 to wait until the user of the second terminal 150 can understand the meaning of the words that the user of the first terminal 100 speaks. Therefore, according to the embodiment, a smoother user experience can be provided. Also, according to the embodiment, a user experience with improved reactivity can be provided. Furthermore, according to the embodiment, an improved user experience can be provided.

Figure 16:
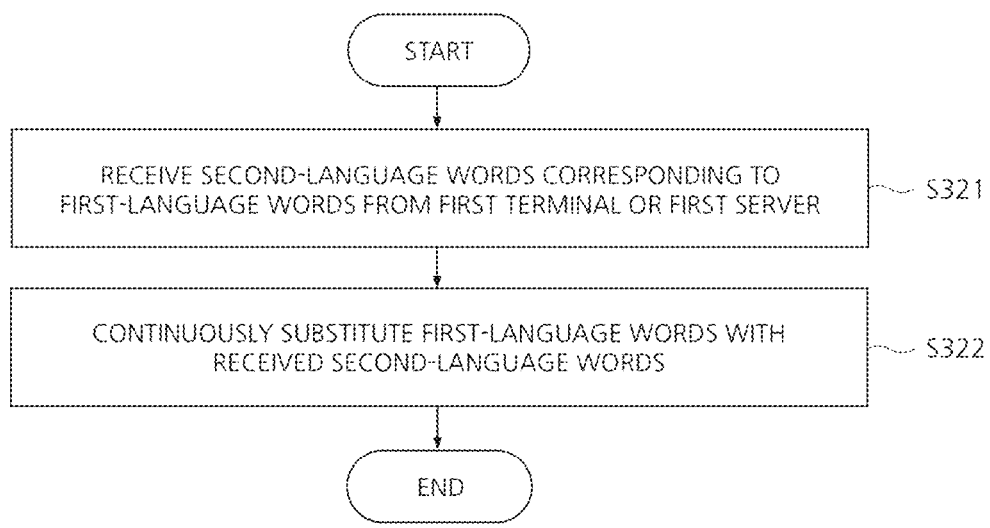
FIG. 16 is a flowchart of a process of continuously substituting words included in a voice recognition result with second-language words, according to an embodiment.

FIG. 16 is a flowchart of operation S320 of continuously substituting the words included in the voice recognition result with the second-language words, according to an embodiment. Referring to FIG. 16, in operation S321, the second-language words having identical or similar meaning to the first-language words may be received from the first terminal 100 or the first server 200.

For example, as illustrated in FIG. 6, it is assumed that "I" has been received and displayed till now as a voice recognition result. The communication interface 104 of the second terminal 150 may receive second-language words corresponding to words included in the voice recognition result. In other words, the communication interface 104 may receive a Korean word "나는" corresponding to "I".

After transmitting the voice recognition result to the second terminal 150, the first terminal 100 may transmit the second-language words corresponding to the words included in the voice recognition result to the second terminal. The communication interface 104 may receive the second-language words from the first terminal 100.

According to another embodiment, after transmitting the voice recognition result to the second terminal 150, the first terminal 100 may transmit the words included in the voice recognition result to the first server 200. The first server 200 may be a server that provides a dictionary service. The first server 200 may receive the words included in the voice recognition result. The first server 200 may convert the words into second-language words corresponding to the words. The first server 200 may transmit the converted second-language words to the second terminal 150. The communication interface 104 may receive the second-language words from the first server 200.

Referring to FIG. 16 again, in operation S322, the first-language words may be continuously substituted with the received second-language words. The display 105 of the second terminal 150 may continuously substitute the first-language words with the received second-language words.

Figure 17:
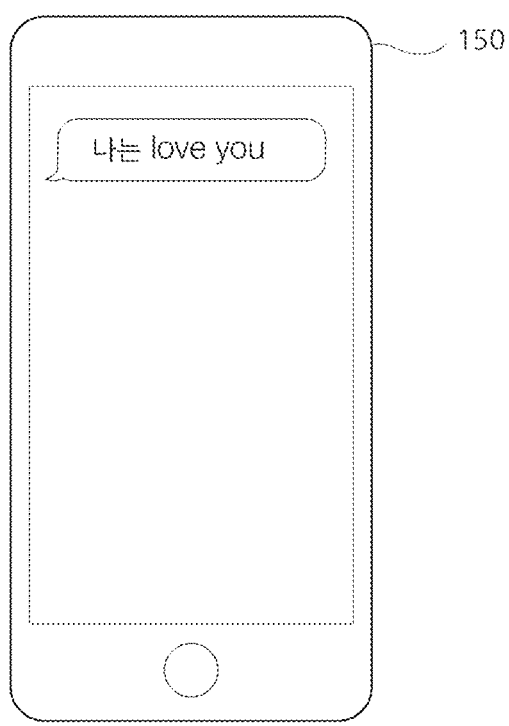
FIG. 17 is a reference diagram for describing a process of continuously substituting words included in a voice recognition result with second-language words, according to an embodiment.
Figure 18:
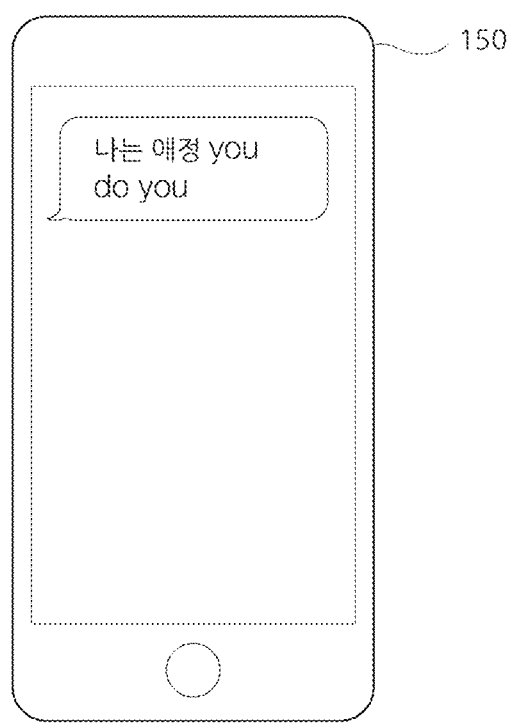
FIG. 18 is another reference diagram for describing a process of continuously substituting words included in a voice recognition result with second-language words, according to an embodiment.
Figure 19:
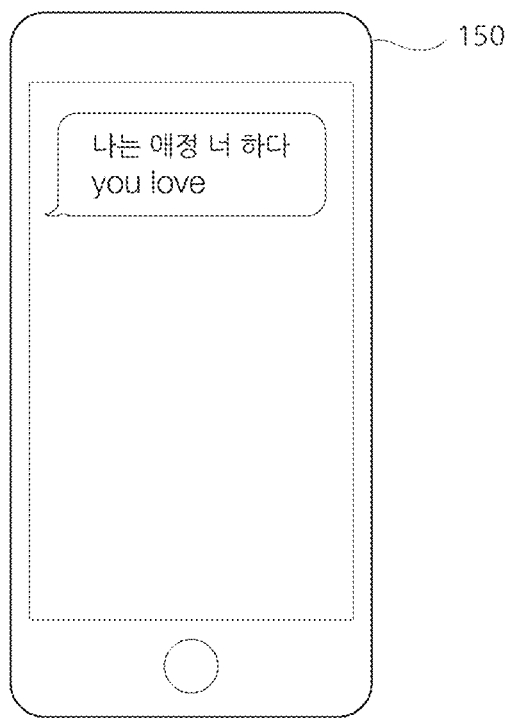
FIG. 19 is another reference diagram for describing a process of continuously substituting words included in a voice recognition result with second-language words, according to an embodiment.

FIGS. 17 to 19 are reference diagrams for describing operation S322 of continuously substituting the words included in the voice recognition result with second-language words, according to an embodiment. As illustrated in FIG. 17, the controller 102 of the second terminal 150 may substitute "I" included in the voice recognition result with a Korea word "나는". Also, the communication interface 104 of the second terminal 150 may additionally receive "love you" as a voice recognition result. The display 105 of the second terminal 150 may additionally display the received voice recognition result. In this manner, the display 105 of the second terminal 150 may display "나는 love you".

Referring to FIG. 18, the communication interface 104 of the second terminal 150 may receive a Korean word "애정"

corresponding to "love" among the words included in the first-language voice recognition result. The display 105 of the second terminal 150 may substitute "love" with "애정". Also, the communication interface 104 of the second terminal 150 may additionally receive "do you" as a voice recognition result. The display 105 of the second terminal 150 may additionally display the received voice recognition result. In this manner, the display 105 of the second terminal 150 may display " 나는 애정 you do you".

Referring to FIG. 19, the communication interface 104 of the second terminal 150 may receive Korean words "너" and "하다" corresponding to "love" and "do" among the words included in the first-language voice recognition result. The display 105 of the second terminal 150 may substitute "you" with "너" and substitute "do" with "하다". Also, the communication interface 104 of the second terminal 150 may additionally receive "love" as a voice recognition result. The display 105 of the second terminal 150 may additionally display the received voice recognition result. In this manner, the display 105 of the second terminal 150 may display "나는 애정 너 하다 you love".

Figure 20:
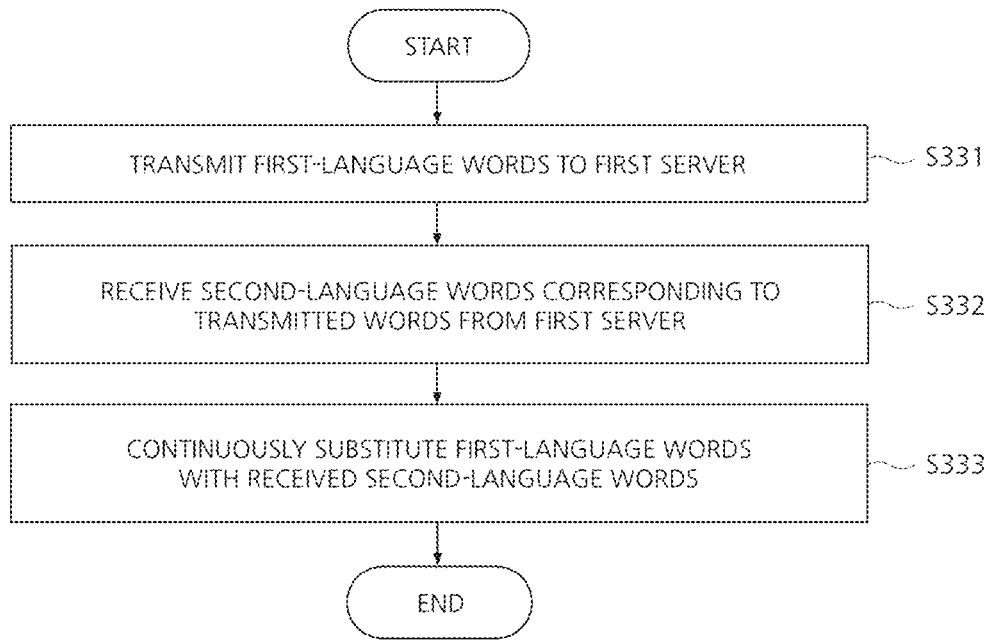
FIG. 20 is a flowchart of a process of continuously substituting words included in a voice recognition result with second-language words, according to another embodiment.

FIG. 20 is a flowchart of operation S330 of continuously substituting the words included in the voice recognition result with the second-language words, according to another embodiment. Referring to FIG. 20, in operation S331, the first-language words may be transmitted to the first server 200.

The communication interface 104 of the second terminal 150 may transmit the first-language words to the first server 200. The first server 200 may receive the words from the second terminal 150. The first server 200 may convert the words into second-language words corresponding to the words. The first server 200 may transmit the converted second-language words to the second terminal 150.

In operation S332, the second-language words having identical or similar meanings to the transmitted words may be received from the first server 200. The communication interface 104 of the second terminal 150 may receive the second-language words from the first server 200.

In operation S333, the first-language words may be continuously substituted with the received second-language words. The display 105 of the second terminal 150 may substitute the first-language words with the second-language words.

Figure 21:
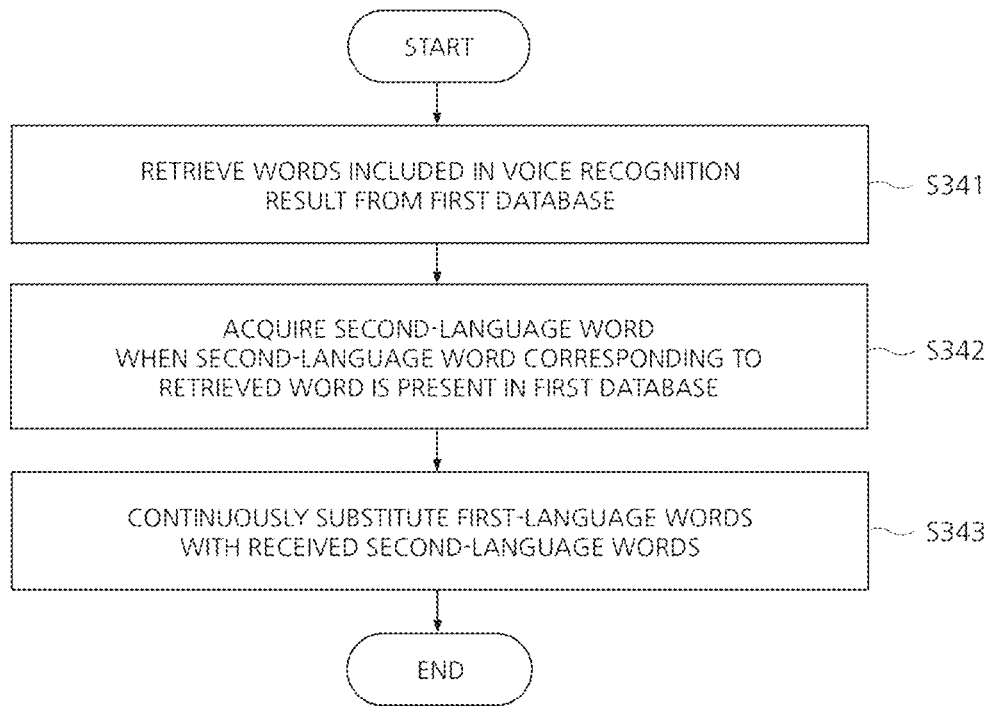
FIG. 21 is a flowchart of a process of continuously substituting words included in a voice recognition result with second-language words, according to another embodiment.

FIG. 21 is a flowchart of operation S330 of continuously substituting the words included in the voice recognition result with the second-language words, according to another embodiment. Referring to FIG. 21, in operation S341, the words included in the voice recognition result may be retrieved from a first database.

The storage 103 of the second terminal 150 may include the first database. According to another embodiment, the first database may be disposed outside the second terminal 150.

The first database may be a dictionary database. The first database may be a relational database in which first-language words and second-language words corresponding to the words are stored. A meaning of the first-language word may be identical to or similar to a meaning of the second-language word corresponding to the word. Records included in the first database may include a first-language word and a second-language word corresponding to the word.

The controller 102 of the second terminal 150 may retrieve first-language words included in the voice recognition result from the first database. In this manner, the controller 102 may determine whether a second-language word corresponding to the first-language word is present in the first database.

In operation S342, when the second-language words corresponding to the retrieved words are present in the first database, the second-language words corresponding to the retrieved words may be acquired from the first database as a result of the retrieving. When a record corresponding to the first-language word is included in the first database, the controller 102 of the second terminal 150 may acquire the second-language word from the first database.

In operation S343, the retrieved first-language words may be substituted with the acquired second-language words. The display 105 of the second terminal 150 may substitute the first-language words with the second-language words.

Figure 22:
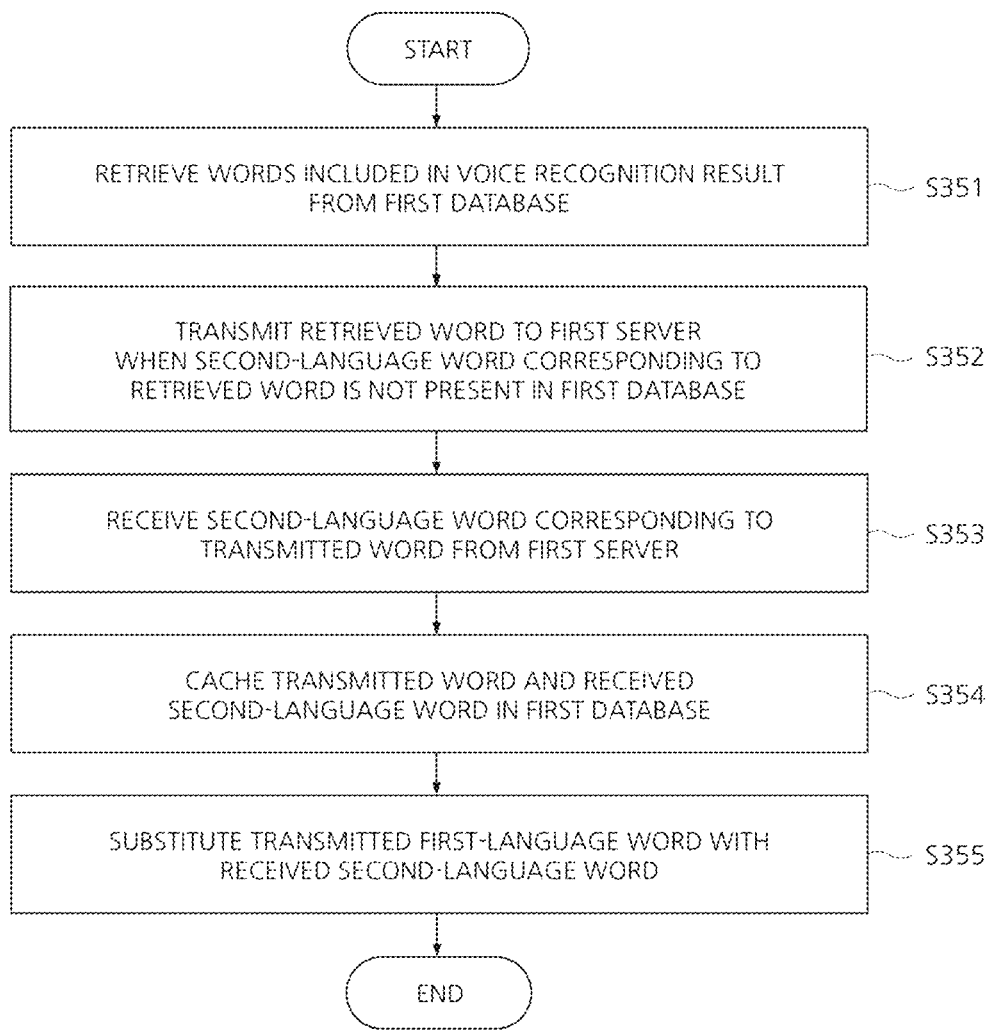
FIG. 22 is a flowchart of a process of continuously substituting words included in a voice recognition result with second-language words, according to another embodiment.

When the record corresponding to the first-language word is not included in the first database, the second terminal 150 may receive a second-language word corresponding to the first-language word from the first server 200. FIG. 22 is a flowchart of operation S330 of continuously substituting the words included in the voice recognition result with the second-language words, according to another embodiment. Referring to FIG. 22, in operation S351, words included in the voice recognition result may be retrieved from a first database.

In operation S352, when the second-language word corresponding to the retrieved word is not present in the first database, the retrieved word may be transmitted to the first server 200. The communication interface 104 of the second terminal 150 may transmit the first-language word to the first server 200.

The first server 200 may receive the first-language word from the second terminal 150. The first server 200 may convert the word into a second-language word corresponding to the word. The first server 200 may transmit the converted second-language word to the second terminal 150.

In operation S353, the second-language word having an identical or similar meaning to the transmitted word may be received from the first server 200. The communication interface 104 of the second terminal 150 may receive the second-language word from the first server 200.

In operation S354, the transmitted word and the received second-language word may be cached in the first database. The second terminal 150 may store the first-language word and the received second-language word in the first database. The first database may newly generate records including the first-language word and the received second-language word. Accordingly, when the first-language word is retrieved from the first database next time, the second terminal 150 may be ready to acquire the second-language word as a result of the retrieving.

In operation S355, the transmitted first-language word may be substituted with the received second-language word. The display 105 of the second terminal 150 may substitute the first-language word with the second-language word.

Referring to FIG. 15 again, in operation S360, a second-language translation of an ended sentence included in the displayed voice recognition result may be acquired. For example, the second terminal 150 may acquire "나는 당신을 사랑합니다." as the translation of the ended sentence "I love you" included in the voice recognition result.

In operation S370, the ended sentence, at least a part of which is substituted with the second-language word, may be substituted with the acquired translation. The display 105 of the second terminal 150 may substitute the ended sentence, at least a part of which has already been substituted with the second-language word, with the acquired translation.

Figure 23:
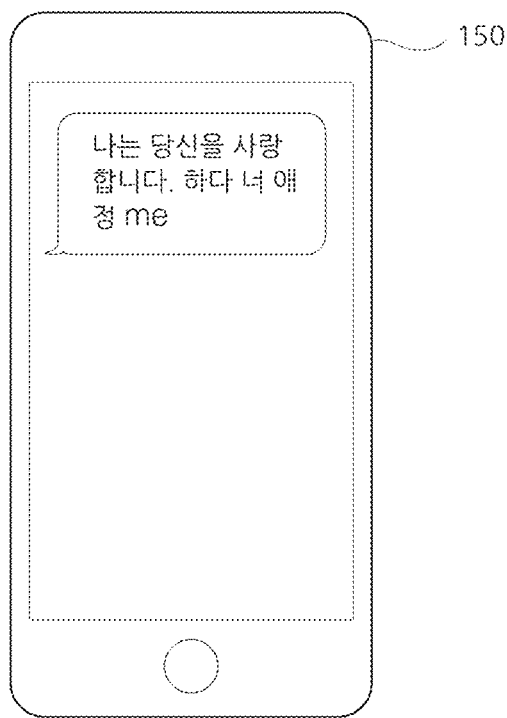
FIG. 23 is a reference diagram for describing a process of substituting an ended sentence, which has been substituted with second-language words, with an acquired translation, according to an embodiment.

For example, referring to FIG. 19, the display 105 may substitute Oil "나는 애정 너", which corresponds to the ended sentence "I love you", with the acquired translation. As illustrated in FIG. 23, the display 105 may substitute the "나는 애정 너" part with "나는 당신을 사랑합니다."

Also, the communication interface 104 of the second terminal 150 may continuously receive a first-language voice recognition result from the first terminal 100 since then. The display 105 of the second terminal 150 may continuously display the received voice recognition result since then. The display 105 of the second terminal 150 may substitute the first-language word with the second-language word corresponding to the word since then. The display 105 of the second terminal 150 may continuously detect an ended sentence since then. The display 105 of the second terminal 150 may substitute the detected sentence with a translation since then.

For example, as illustrated in FIG. 23, the communication interface 104 may additionally receive "me" as the voice recognition result. The display 105 may additionally display "me". The display 105 may substitute "love" with "애정". The controller 102 may detect the "do you love me" part as one ended sentence. The controller 102 may acquire a second-language translation of the detected sentence. The display 105 of the second terminal 150 may substitute the "하다 너 애정" part corresponding to "do you love me" with "당신은 나를 사랑합니까?" as illustrated in FIG. 14.

Figure 24:
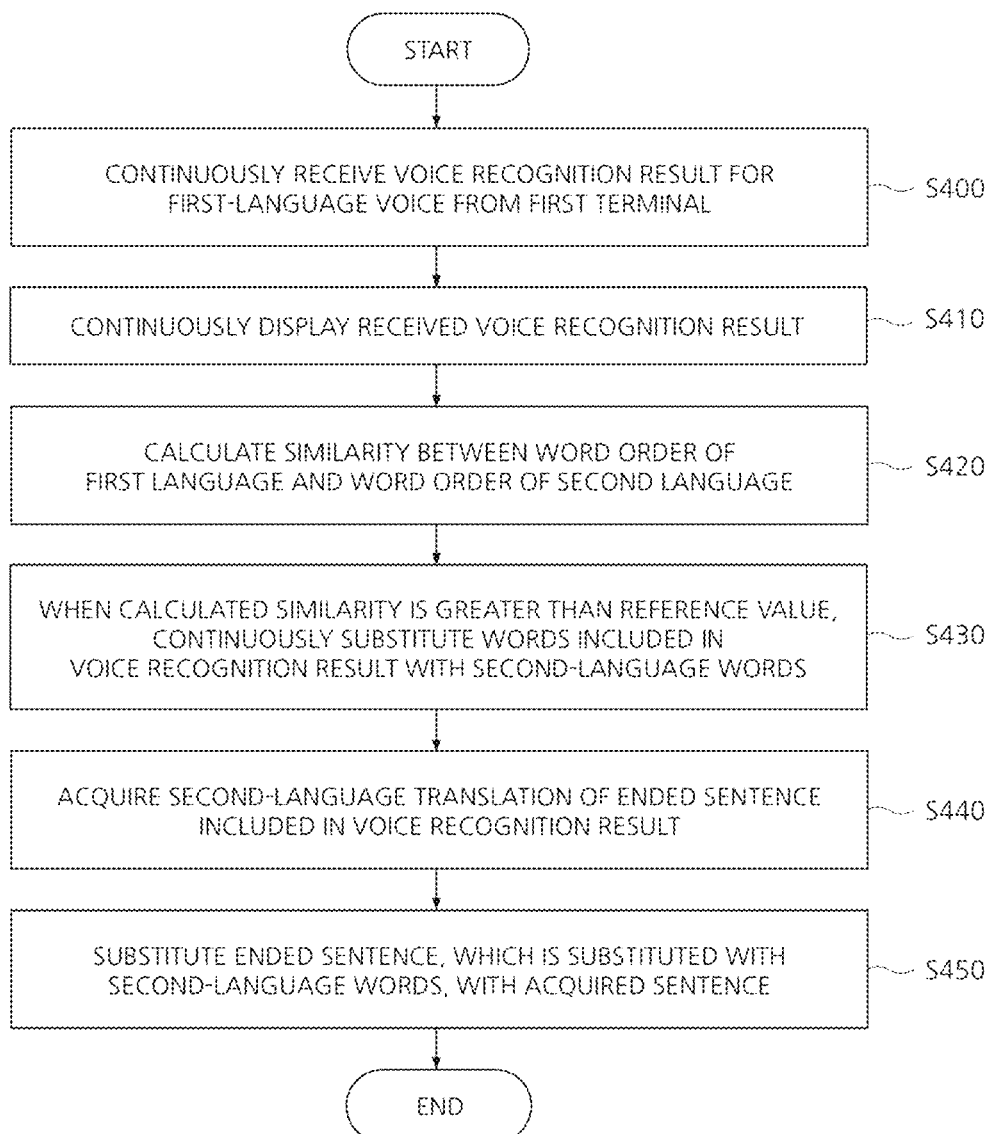
FIG. 24 is a flowchart of a language translation method that is performed by a second terminal, according to another embodiment.

FIG. 24 is a flowchart of a language translation method that is performed by the second terminal 150, according to another embodiment. Referring to FIG. 24, in operation S400, a voice recognition result for a first-language voice may be continuously received from the first terminal 100 as a first-language text. In operation S410, the received voice recognition result may be continuously displayed.

In operation S420, a similarity between a word order of the first language and a word order of the second language may be calculated. The controller 102 of the second terminal 150 may calculate the similarity between the word order of the first language and the word order of the second language.

The respective languages may have a specific order in which a subject, an object, and a transitive verb are arranged within one sentence. For example, in the case of an English or Chinese sentence, a subject, a transitive verb, and an object are arranged in this order. As another example, in the case of a Korean or Japanese sentence, a subject, an object, and a transitive verb are arranged in this order.

The controller 102 of the second terminal 150 may calculate the similarity using an order in which a subject, an object, and a transitive verb are arranged within a first-language sentence and an order in which a subject, an object, and a transitive verb are arranged within a second-language sentence. The similarity calculated when the first language is English and the second language is Chinese may be higher than the similarity calculated when the first language is English and the second language is Korean.

In operation S430, when the calculated similarity is greater than a reference value, words included in the first-language voice recognition result may be continuously substituted with second-language words having identical or similar meaning thereto. On the other hand, when the calculated similarity is not greater than the reference value, operation S430 of substituting the first-language words with the second-language words may not be performed.

When the first-language word is substituted with the second language even though the word order of the first language and the word order of the second language are not sufficiently similar to each other, readability experienced by the user of the second terminal 150 may be significantly low. On the other hand, when the first-language word is substituted with the second language in a case where the word order of the first language and the word order of the second language are sufficiently similar to each other, readability experienced by the user of the second terminal 150 may be sufficiently ensured. Therefore, according to the embodiment, a smoother user experience can be provided. Also, according to the embodiment, a user experience with improved reactivity can be provided. Furthermore, according to the embodiment, an improved user experience can be provided.

For example, when the first language is English and the second language is Korean, the reference value may be identical to the calculated similarity. Therefore, when first language is English and the second language is Chinese, the display 105 of the second terminal 150 may continuously substitute the first-language words with second-language words corresponding to the words.

In operation S440, a second-language translation of an ended sentence included in the displayed voice recognition result may be acquired. In operation S450, the ended sentence, at least a part of which is substituted with the second-language words, may be substituted with the acquired translation.

Figure 25:
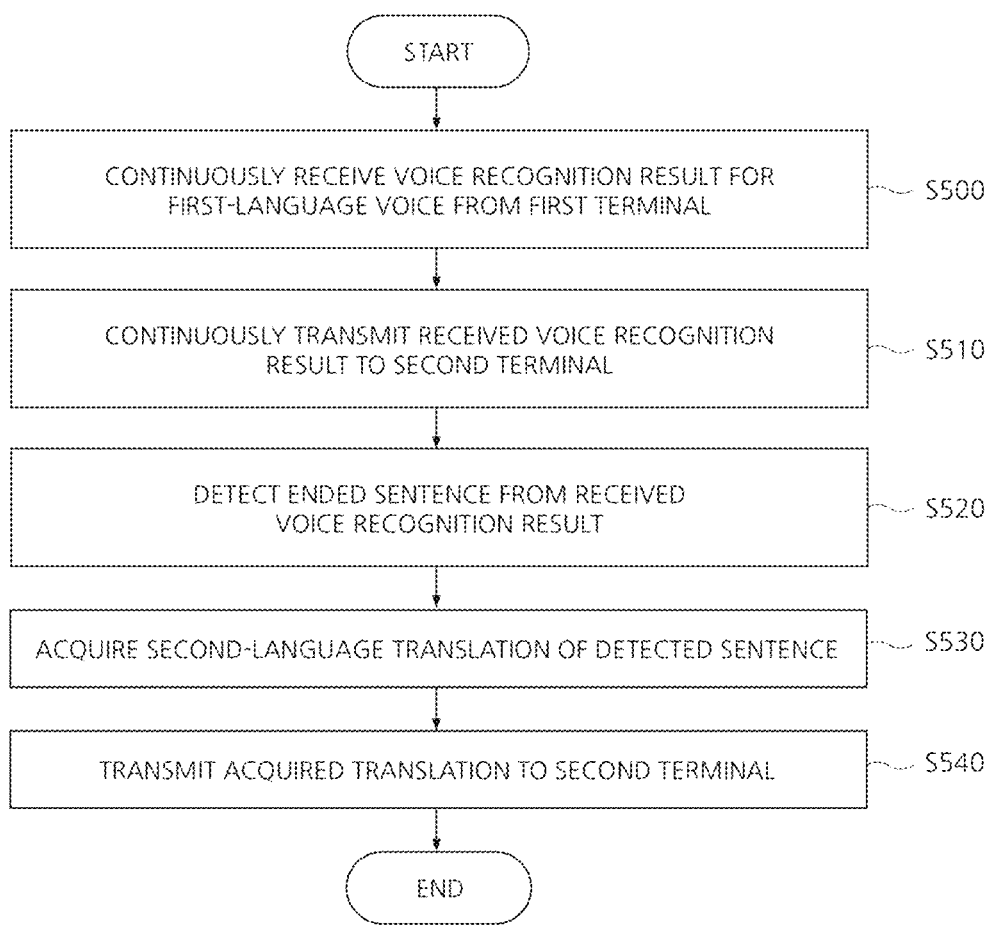
FIG. 25 is a flowchart of a language translation method that is performed by a server, according to an embodiment.

FIG. 25 is a flowchart of a language translation method that is performed by a server, according to an embodiment. The server may be the first server 200, the second server 300, or the third server 400. The server may be the first server 200, the second server 300, or the third server 400. The server may be connected to the first terminal 100 and the second terminal 150.

Referring to FIG. 25, in operation S500, a voice recognition result for a first-language voice may be continuously received from the first terminal 100 as a first-language text. In operation S510, the received voice recognition result may be continuously transmitted to the second terminal 150. While the voice recognition result is being received, the server may continuously transmit at least a part of the voice recognition result received till now to the second terminal 150.

In operation S520, an ended sentence may be detected from the received voice recognition result. The server may detect at least one ended sentence included in the voice recognition result transmitted till now.

In operation S530, a second-language translation of the detected sentence may be acquired. The server may acquire the second-language translation of the detected at least one ended sentence.

In operation S540, the acquired translation may be transmitted to the second terminal 150. While the voice recognition result is being received, the server may transmit the acquired translation to the second terminal 150.

According to the embodiments set forth above, even though users making a video call use different languages, each user can understand what the other party is saying. Also, a smoother user experience can be provided. Furthermore, a user experience with improved reactivity can be provided. Moreover, an improved user experience can be provided.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Embodiments may be embodied in a non-transitory computer-readable recording medium having recorded thereon computer-executable instruction codes, such as a program module executable by the computer. The non-transitory computer-readable recording medium may be any available medium which can be accessed by the computer and may include any volatile and non-volatile media and any removable and non-removable media.

Furthermore, the non-transitory computer-readable recording medium may include any computer storage medium and communication medium. The computer storage medium may include any volatile and non-volatile media or any removable and non-removable media embodied by a certain method or technology for storing information such as computer-readable instruction codes, a data structure, a program module, or other data. The communication medium may include computer-readable instruction code, a data structure, a program module, other data of modulated data signals, or other transmission mechanisms, and may include any information transmission medium.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of a video call between a first terminal of a first user and a second terminal of a second user, the method comprising:
   receiving, by the second terminal, video call data originating from the first terminal;
   displaying, on a display screen of the second terminal, a video stream comprising verbal expressions of the first user in a first language based on the video call data; and
   further displaying, on the display screen of the second terminal, a sequence of visual representations for the first user's verbal expressions along with the video stream, wherein displaying the sequence of visual representations comprises:
   displaying, on the display screen, a first visual representation of the first user's verbal expressions in the first language, wherein the verbal expressions comprise a first sentence and at least one additional word following the first sentence, and
   subsequently, in response to detecting an end of the first sentence within the verbal expressions, displaying a second visual representation on the display screen in replacement of the first visual representation, in which a translation of the first sentence in a second language substitutes the first sentence of the first visual representation such that the second visual representation displayed on the display screen comprises the translation of the first sentence in the second language and the at least one additional word in the first language following the translation.

2. The method of claim 1,
   wherein the verbal expressions comprise a second sentence following the first sentence, and
   wherein when the second sentence is complete in the verbal expressions, a third visual representation is displayed on the display screen in replacement of the second visual representation, the third visual representation comprising a translation of the second sentence in the second language that follows the translation of the first sentence in the second language.

3. The method of claim 2, further comprising processing the verbal expressions to determine whether the verbal expressions comprise a complete sentence in the first language.

4. The method of claim 3, wherein processing the verbal expressions is performed by at least one of the first terminal and the second terminal.

5. The method of claim 3, wherein processing the verbal expressions is performed by a server coordinating the video call.

6. The method of claim 3, further comprising translating the first sentence in the first language into the translation of the first sentence in the second language when the first sentence is complete.

7. A non-transitory computer-readable recording medium having recorded thereon a program for executing the method of claim 1.

* * * * *